(12) United States Patent
Gupta et al.

(10) Patent No.: US 10,279,470 B2
(45) Date of Patent: May 7, 2019

(54) SYSTEM AND METHOD FOR FACILITATING PROGRAM SHARING

(71) Applicant: Play-i, Inc., San Mateo, CA (US)

(72) Inventors: Saurabh Gupta, Sunnyvale, CA (US); Vikas Gupta, Palo Alto, CA (US); Kevin Liang, San Mateo, CA (US)

(73) Assignee: Play-i, Inc., San Mateo, CA (US)

( * ) Notice: Subject to any disclaimer, the term of this patent is extended or adjusted under 35 U.S.C. 154(b) by 0 days.

(21) Appl. No.: 15/456,113

(22) Filed: Mar. 10, 2017

(65) Prior Publication Data

US 2017/0291295 A1 Oct. 12, 2017

Related U.S. Application Data

(63) Continuation-in-part of application No. 15/299,292, filed on Oct. 20, 2016, now Pat. No. 9,718,185, which is a continuation of application No. 14/737,347, filed on Jun. 11, 2015, now Pat. No. 9,498,882.

(60) Provisional application No. 62/011,478, filed on Jun. 12, 2014, provisional application No. 62/015,969, filed on Jun. 23, 2014, provisional application No. 62/305,299, filed on Mar. 8, 2016.

(51) Int. Cl.
*G06F 19/00* (2018.01)
*B25J 9/00* (2006.01)
*B25J 13/06* (2006.01)
*G09B 19/00* (2006.01)

(52) U.S. Cl.
CPC ............ *B25J 9/0081* (2013.01); *B25J 13/06* (2013.01); *G09B 19/0053* (2013.01); *Y10S 901/04* (2013.01)

(58) Field of Classification Search
None
See application file for complete search history.

(56) References Cited

U.S. PATENT DOCUMENTS

| D290,032 S | 5/1987 | Horiuchi |
|---|---|---|
| 5,638,522 A | 6/1997 | Dunsmuir et al. |
| D471,243 S | 3/2003 | Cioffi et al. |
| 6,604,021 B2 | 8/2003 | Imai et al. |
| 6,668,211 B1 | 12/2003 | Fujita et al. |
| 6,895,305 B2 | 5/2005 | Lathan et al. |
| D559,288 S | 1/2008 | Matsuda |
| D624,610 S | 9/2010 | Wu et al. |
| D639,353 S | 6/2011 | Stibolt |
| D641,805 S | 7/2011 | Kichijo et al. |
| D650,866 S | 12/2011 | Clahsen |
| D672,402 S | 12/2012 | Macadam |

(Continued)

FOREIGN PATENT DOCUMENTS

WO 103525 8/2012

*Primary Examiner* — Bhavesh V Amin
(74) *Attorney, Agent, or Firm* — Jeffrey Schox; Diana Lin

(57) ABSTRACT

Embodiments of a method and system for sharing toy robot programs enabling toy robots to interact with physical surroundings can include receiving a robot program; automatically processing a token for the robot program; and processing a program request for the robot program based on the token. The embodiments can additionally or alternatively include controlling a toy robot based on a robot program; recommending a robot program; publishing a robot program; processing modifications of robot programs S160; and/or any other suitable functionality.

20 Claims, 27 Drawing Sheets

(56) References Cited

U.S. PATENT DOCUMENTS

| | | |
|---|---|---|
| D688,328 S | 8/2013 | Holm |
| D689,957 S | 9/2013 | Jensen |
| D701,923 S | 4/2014 | Jensen |
| 8,812,157 B2 | 8/2014 | Morioka et al. |
| D718,394 S | 11/2014 | Weiss |
| 8,886,359 B2 | 11/2014 | Inaba et al. |
| 9,079,305 B2 | 7/2015 | Williamson et al. |
| D748,204 S | 1/2016 | Simonds et al. |
| 9,446,510 B2 | 9/2016 | Vu et al. |
| 9,459,838 B2 | 10/2016 | Lam et al. |
| 2004/0186623 A1 | 9/2004 | Dooley et al. |
| 2011/0276058 A1 | 11/2011 | Choi et al. |
| 2013/0324004 A1 | 12/2013 | Schwartz |
| 2014/0047406 A1* | 2/2014 | Lam .......................... G06F 8/20 717/104 |
| 2017/0291295 A1* | 10/2017 | Gupta .................... B25J 9/0081 |

* cited by examiner

Content browser alt
Thumbnails are program snapshot

Content browser, categories along the top.

1. popular: "All sorted by upvotes. 2. Picks: WW picks.
4. New: A list sorted by upvotes of the newest programs.
5. - Mine - what I have published My Content Blockly - Rename & Delete stay the same Wonder - Rename & Delete stay the same Remixed from Program Name    < can link to a local program (freeplay)
- or the remote program (browser detail)

Deleting parent program

Confirm
Un-checked by default

Yes, delete remixes

Original X ➡ ~~Original~~
    Remix      ~~Remix~~

Original X ➡ ~~Original X~~
    Remix      ~~Remix~~
    Remix      ~~Remix~~

No, keep remixes

Original X ➡ ~~Original~~
    Remix      New Original

Original X ➡ ~~Original X~~
    Remix      New Original
    Remix      Remix tokens (e.g., codes)

Freeplay with Share button

Share or Publish ?

Quick Share

Tapped Copy Code

Picks text Wonder or Blockly

Program saves and opens in FreePlay

S155

Pick a project name

Enter Description

After publisher - show the program

Child can share link user chooses to publish modification (e.g., remix)

original (e.g., parent) robot program unpublished: checkbox selectable by use (e.g., unchecked by default) to publish original robot program if unpublished user chooses to publish original can include or omit recursion checks (e.g., ignore parents or parent)

Need a name for the parent

Checked box determines

Original >
   Remix > ➡ Original
       Remix

Original >
   Remix > ➡ Original

Remixes of remixed ignored

Original >
   Remix > ➡ Original
      Remix      Remix

Original >
   Remix > ➡ Original
      Remix

SYSTEM AND METHOD FOR FACILITATING PROGRAM SHARING

CROSS-REFERENCE TO RELATED APPLICATIONS

This application is a continuation-in-part of U.S. patent application Ser. No. 15/299,292, filed on 20 Oct. 2016, which is a continuation of U.S. patent application Ser. No. 14/737,347, filed on 11 Jun. 2015, which claims the benefit of U.S. Provisional Application Nos. 62/011,478 filed 12 Jun. 2014, and 62/015,969 filed 23 Jun. 2014, all of which are incorporated in their entireties by this reference.

This application additionally claims the benefit of U.S. Provisional Application No. 62/305,299, filed on 8 Mar. 2016, which is incorporated in its entirety by this reference.

This application is related to U.S. patent application Ser. No. 15/260,865, filed on 9 Sep. 2016, which is incorporated in its entirety by this reference.

TECHNICAL FIELD

This invention relates generally to the robotics field, and more specifically to a new and useful system and method for robot program sharing.

BRIEF DESCRIPTION OF THE FIGURES

FIG. 23 is a schematic representation of publishing a modification of a robot program in a variation of a method for sharing robot programs;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
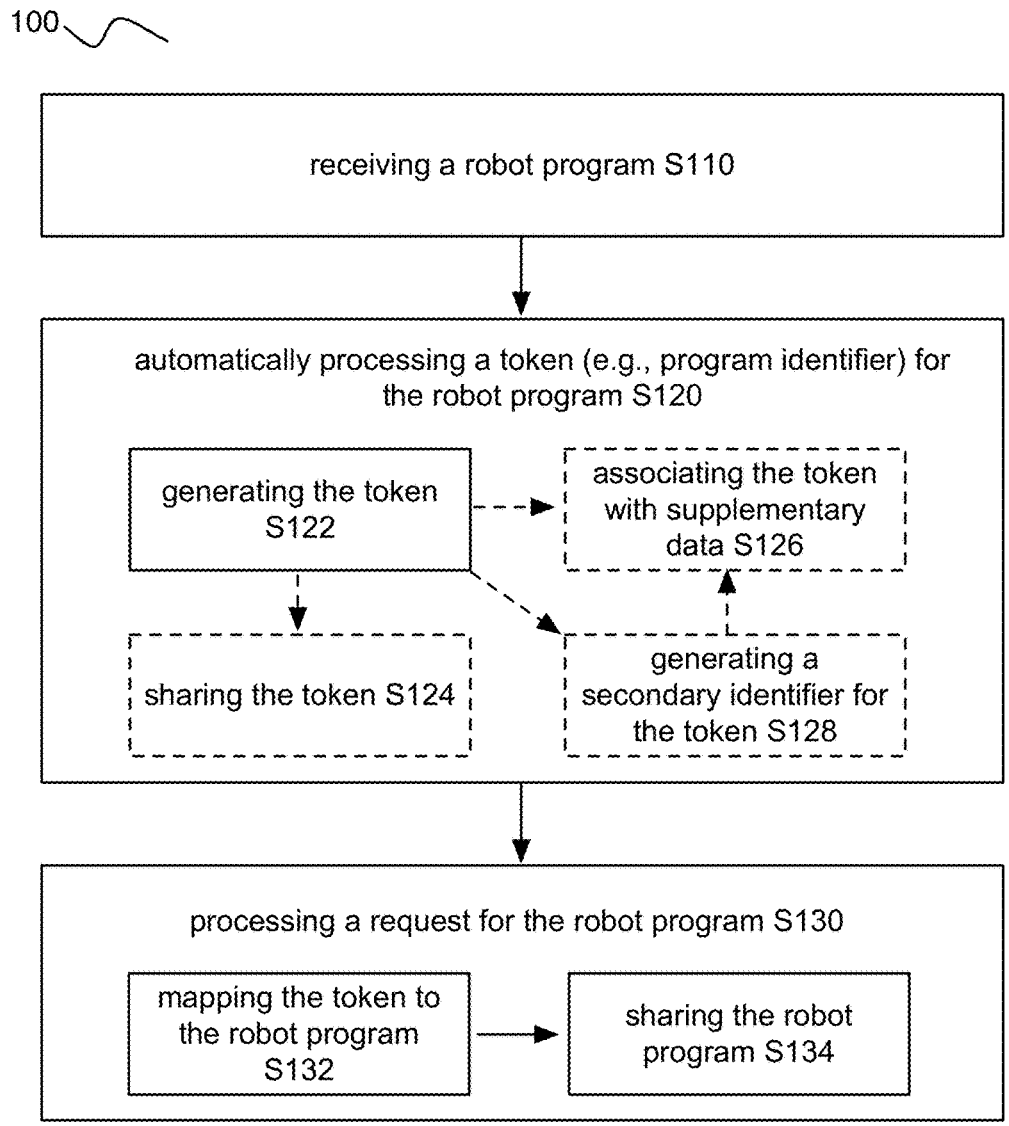
FIG. 1 is a flow chart representation of variations of a method for sharing robot programs.
Figure 2:
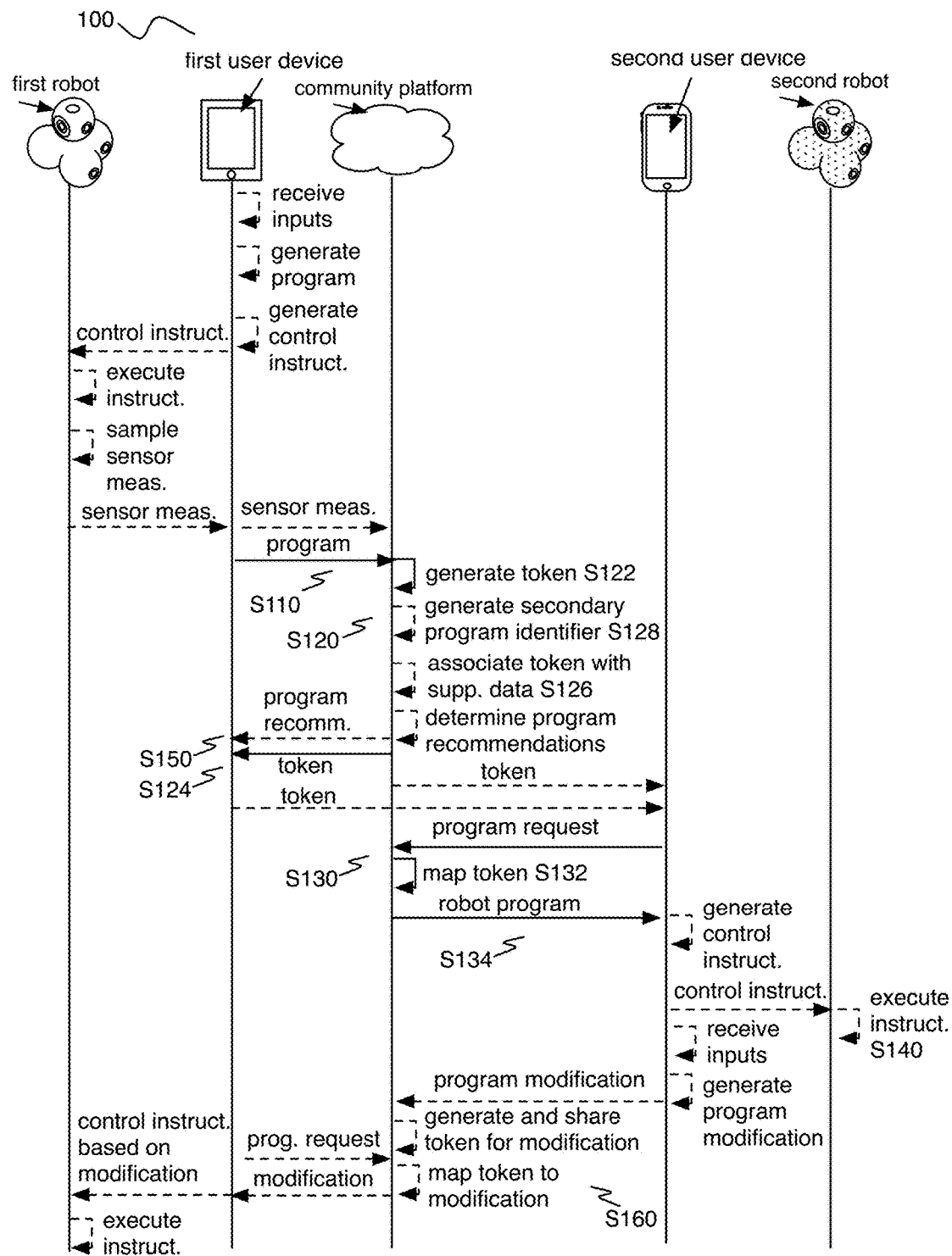
FIG. 2 is a flow chart representation of variations of a method for sharing robot programs.

As shown in FIGS. 1-2, an embodiment of a method 100 for sharing robot programs (e.g., toy robot programs) can include: receiving a robot program S110; automatically processing a token (e.g., program identifier) for the robot program S120; and processing a program request for the robot program based on the token S130. The method 100 can additionally or alternatively include: controlling a robot (e.g., toy robot) based on a robot program S140; recommending a robot program S150; publishing a robot program S155; processing modifications of robot programs S160; and/or any other suitable functionality.

Embodiments of the method 100 and system 200 can function to provide a community platform for sharing and/or discovery of robot programs enabling robot interaction with physical surroundings. Additionally or alternatively, embodiments of the method 100 and system 200 can function to encourage and enable robot program sharing while accommodating user privacy preferences, such as in relation to the Children's Online Privacy Protection Act (COPPA), but the method 100 and system 200 can otherwise function in any suitable manner. Any portion of the method 100 can be implemented with any combination of components of the system 200, and/or any suitable components.

2. Benefits.

Software program sharing can confer a variety of benefits, including one or more of: encouragement of both novices and experts to program, programming education, community recognition, collaboration, and/or other suitable benefits. However, program sharing in the context of robots, and especially toy robots (e.g., where the users are children), presents several challenges. First, conventional program sharing methodologies can be inconvenient and inefficient when applied to the field of robotics due to failing to account for the robot hardware (e.g., specific programming languages for the robot; generating and/or transmitting control instructions for operating the robot based on shared program code; accounting for the robot features such as different sensors and/or output elements; etc.). Second, conventional program sharing methodologies can be unsuitable for children due to complexity (e.g., requiring proficiency in other technologies such as web browsers and the Internet; multi-step protocols for sharing software programs with other users; for collaborating with other users in generating programs; etc.), purpose (e.g., program recommendation algorithms based on profession versus recommendations purposed for education, etc.), inappropriateness (e.g., age-inappropriate sharable programs and/or program recommendations, etc.), and/or other factors. Third, conventional program sharing methodologies can rely on users' personal information (e.g., user identifiers such as e-mail addresses, user credentials, etc.) that children and/or their guardians are unwilling to share, such as in relation to the COPPA. In specific examples, the method 100 and/or system 200 can confer several benefits over conventional methodologies used for program sharing, program discovery, and/or program collaboration.

First, the technology can encourage programming through streamlined and user-appropriate content sharing. For example, the technology can generate children-appropriate tokens (e.g., a natural language token of "red fox jumps") assigned to different robot programs that users have uploaded to the community platform, where the users can share the tokens amongst each other to download corresponding robot programs. Robot program sharing can enable users to collaborate on programs with tools to modify original programs (e.g., generating a modified program), re-modify modified programs, and/or otherwise facilitate collaboration.

Second, the technology can increase user engagement with robot programming and the robot through a variety of program discovery features in the community platform. For example, the technology can analyze a user's uploaded programs and/or profile to identify and recommend suitable programs (e.g., in terms of difficulty, content, age appropriateness, utilization of different robot features, etc.).

Third, the technology can facilitate programming education through enabling homework submissions systems, community-based events such as robotics competitions, structured learning platforms, and/or other suitable activities.

Fourth, the technology can provide technical solutions necessarily rooted in computer technology (e.g., Internet-based sharing, publishing, and downloading of robot programs over a wireless communication network, etc.) to overcome issues specifically arising with the computer technology (e.g., enabling a robot program online sharing community while accommodating digital privacy restrictions associated with children, etc.). For example, the community platform can associate each robot program with a unique hyperlink enabling users browsing the community platform to select and download robot programs through the unique hyperlinks.

Fifth, the technology components, alone and in combination, can confer improvements to the program sharing technical field by, for example, enabling a program sharing ecosystem tailored to the unique facets of robotics and children users in order to overcome the deficiencies described above for conventional program sharing methodologies. Further, the technology can confer an improvement in the functionality of the robot (e.g., by enabling discovery of robot actions previously unperformed, but uncovered through user collaboration on programs with the community platform), the programming interface (e.g., by improving the programming interface as a tool enabling a user to modify other user's robot programs for their own purposes in operating their robot, etc.), the user device (e.g., through user education improvements leading to efficient user programming and decreased computational load in executing corresponding user programs), and/or any other suitable components. Additionally or alternatively, the technology can amount to an inventive distribution of functionality across a network including a community platform as a communication hub with programming interfaces executing on user devices in communication with corresponding robots, enabling the community platform to deliver personalized content (e.g., program recommendations selected from the set of programs stored at the community platform) to different users.

Sixth, the technology can effect a transformation of an object to a different state or thing. The technology can generate robot control instructions based off of shared robot programs, and actively operate the one or more robots (e.g., emit audio at a speaker, move in the physical environment with wheels, flash lights, detect surroundings in the environment, etc.) based on the shared robot programs. The technology can additionally or alternatively control the robot to transform physical surroundings (e.g., other robots, other toys, connected appliances, etc.) through robot operation states specifying robot interactions with the physical surroundings. However, the technology can provide any other suitable benefit(s) in the context of using non-generalized computing systems for robot program sharing.

3. Method.

Figure 3:
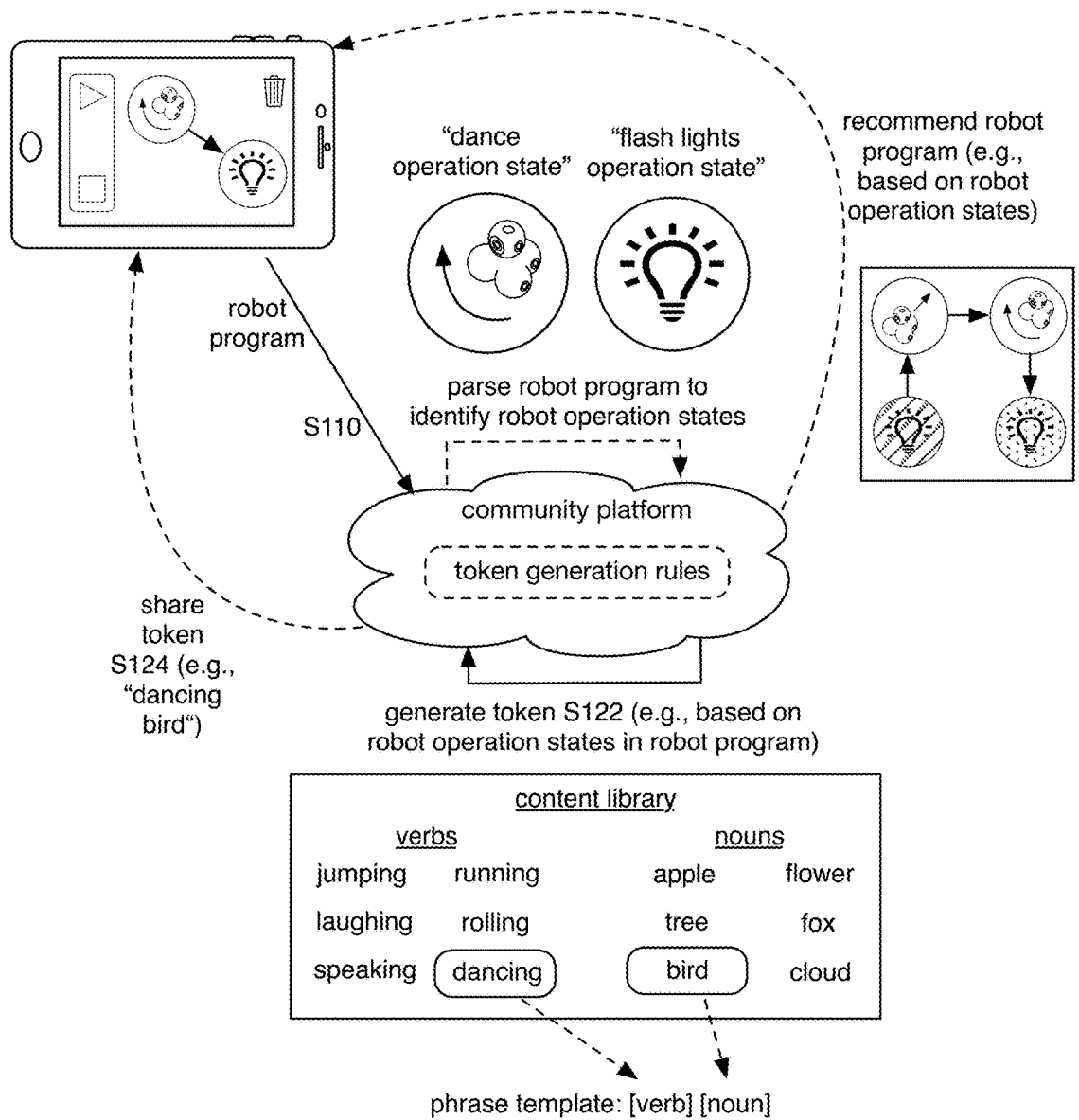
FIG. 3 is a schematic representation of generating and sharing tokens in variations of a method for sharing robot programs.
Figure 9:
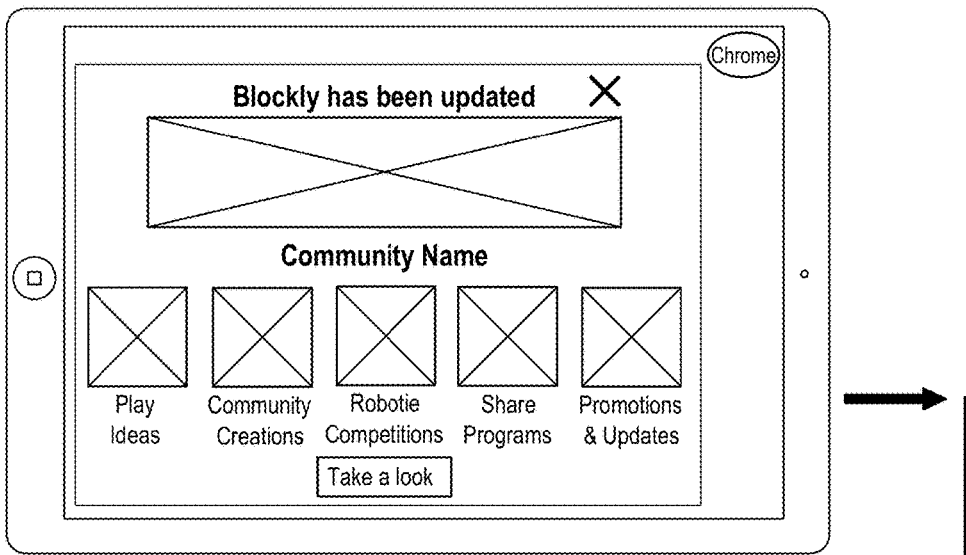
FIG. 9 is a schematic representation of receiving robot programs in a variation of a method for sharing robot programs.
Figure 9:
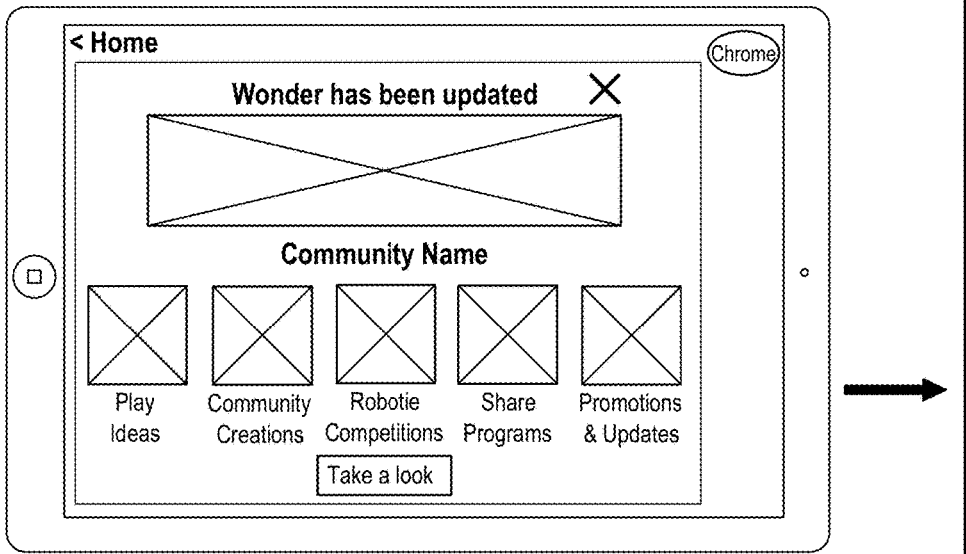
Figure 10:
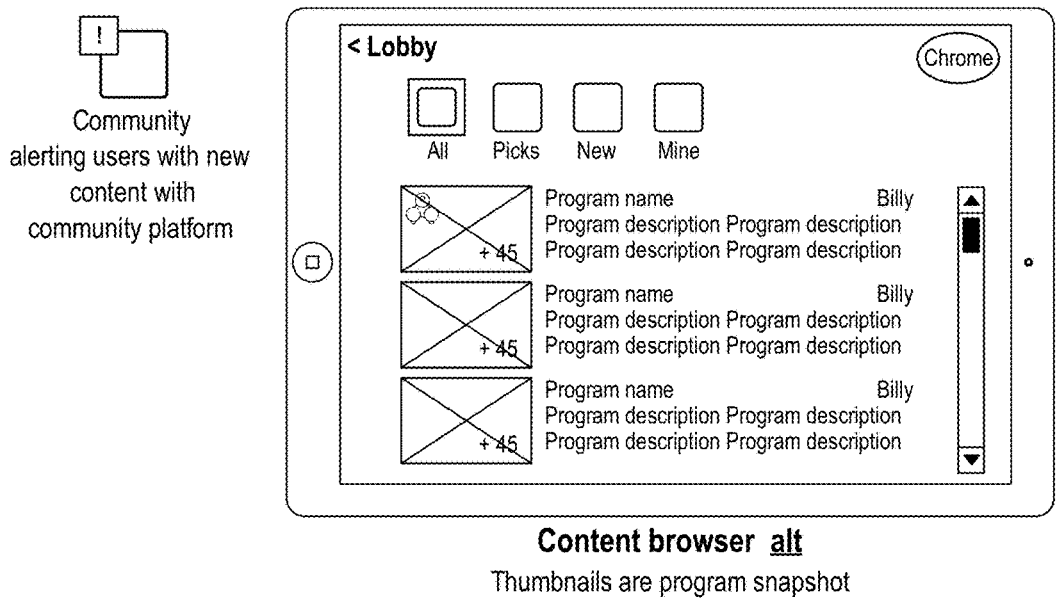
FIG. 10 is a schematic representation of a variation of a robot program browser.
Figure 10:
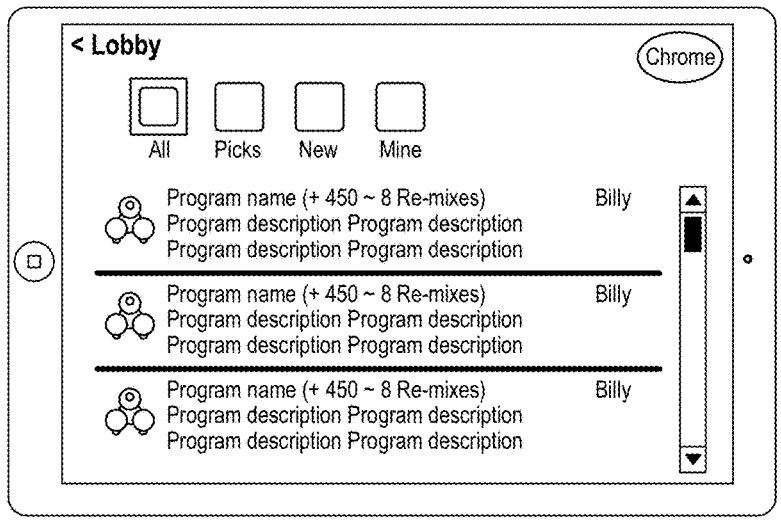

As shown in FIGS. 3 and 9, receiving a robot program S110 functions to obtain a robot program, where a corresponding token can be generated for the robot program to enable sharing of the robot program between users of the community platform.

The robot program is preferably generated from a set of programming inputs at a programming interface (e.g., executing on a user device such as a smart phone, executing at a processing unit of the robot, etc.), but can additionally or alternatively be generated from any suitable data (e.g., robot sensor measurements, etc.). In a first variation, the robot program can include visual programming inputs, such as icons illustrating the robot in different robot operation states, but visual programming inputs can be defined in any manner analogous to U.S. application Ser. No. 15/260,865 filed 9 Sep. 2016, which is herein incorporated in its entirety by this reference. In a second variation, the robot program can include textual programming inputs (e.g., where the associated text can be used as a basis for generating natural language tokens). In a third variation, the robot program can include programming inputs originating from multiple users (e.g., collaborators on the robot program), programming interfaces, user devices, and/or other suitable entities. In a fourth variation, the robot program can include programming tasks (e.g., programming puzzles, robotics competition-related tasks, etc.), where the associated proficiency level on the programming tasks can be used in recommending robot programs suitable for the proficiency level. In a fifth variation, the robot program can include a robot personality (e.g., happy, excited, extroverted, introverted, etc.) that modifies outputs of the robot along with the control instructions. However the robot program can be configured in any manner analogous to U.S. application Ser. No. 15/299,292 filed 20 Oct. 2016, which is herein incorporated in its entirety by this reference, and/or in any suitable manner.

The robot program is preferably executable by the programming interface and/or other suitable interfaces to generate control instructions for operating the robot (e.g., to interact with physical surroundings; to sample sensor measurements; etc.) according to the robot program; but the robot program can otherwise influence robot operation states.

Robot programs are preferably received at a community platform, such as from a user device (e.g., programming interface executing on the user device), a robot (e.g., directly from the robot through a wireless WiFi connection; indirectly, where the robot transmits the robot program to a user device to transmit to the community platform). Additionally or alternatively, robot programs can be received at a robot (e.g., where the robot generates and shares tokens corresponding to received robot programs, etc.), such as from a user device (e.g., an application interface executing on the user device transmitting the robot program to the robot), another robot (e.g., robot-robot communication through a wireless Bluetooth connection), and/or any suitable entity.

Any number of robot programs can be received (e.g., individually, in batch, etc.) from any number of users. For example, a user can select a set of robot programs (e.g., corresponding to a robotics challenge such as a robot program puzzle; to a robotics homework assignment; to a shared theme such as type of robot operation state, etc.) to upload, where the set of robot programs can be processed individually (e.g., generating tokens for each robot program) or in batch (e.g., generating a single token corresponding to the set of robot programs); however, receiving a plurality of robot programs associated with any number of users can be performed in any suitable manner (e.g., wired means; e-mail; text; server upload; other suitable communication frameworks and flows; etc.). Receiving a robot program is preferably in response to manual user upload (e.g., a user selecting a "Share" and/or "Upload" button presented at a programming interface), but can additionally or alternatively be in response to automatic upload (e.g., after every generation of a robot program; at a scheduled time such as a homework deadline; etc.) and/or other suitable trigger events. However, receiving robot programs can be at predetermined time intervals (e.g., hourly to provide cloud backup functionality for the robot programs; daily in batch; etc.), and/or at any suitable time and/or frequency. However, receiving a robot program can be performed in any suitable manner.

Automatically processing a token for the robot program S120 functions to determine and process a token for identifying one or more corresponding robot programs to share. Processing a token can additionally or alternatively include one or more of: generating the token S122, sharing the token S124, associating the token with supplementary data S126, generating a secondary identifier for the token S128, and/or any other suitable operations in relation to processing a token to facilitate robot program sharing. The token is preferably associated (e.g., stored in association) with the robot program, such that the token acts as a program identifier for the robot program, but tokens can additionally or alternatively be associated with supplementary data (e.g., location data, secondary identifiers, etc.), other suitable data, and/or be otherwise defined.

The token can be of any one or more types, including: textual (e.g., natural language phrases; random characters), audio (e.g., music; verbal output; noises; etc.), graphical (e.g., images; emojis; video; barcodes; holographic elements; 3D elements; etc.), tactile (e.g. braille; haptic feedback), programming inputs (e.g., visual programming inputs, textual programming inputs), actions (e.g., robot operation states, user actions, user device-related actions, etc.), robot data (e.g., sensor measurements) and/or any other suitable type.

In a first variation, the token can be a natural language token including one or more natural language words (e.g., "beautiful rainbow"). In a second variation, the token can include one or more programming inputs (e.g., a robot movement type followed by a robot audio output type), where a user inputs the specified programming inputs to facilitate token identification. In a third variation, the token can include robot data (e.g., sampled by the robot associated with the robot program corresponding to the token), such as an image captured by an optical sensor (e.g., camera) of the robot, where the user is asked to select the image from a set of images to facilitate token identification. However, tokens can be otherwise configured.

Processing a token is preferably performed at the community platform, but different portions of processing a token can be performed at any suitable components (e.g., robot, programming interface, user device, etc.). Any number of tokens can be processed for any number of robot programs (e.g., single token for multiple robot programs; multiple tokens for a single robot program; etc.), but a plurality of tokens can be otherwise processed. For example, generating a token can include generating a user-specific token associated with each of the robot programs received from the user.

Processing a token is preferably performed in response to receiving one or more robot programs, but can additionally or alternatively be performed in response to and/or concurrently with another trigger event (e.g., a user requesting a substitute and/or additional token for a robot program; expiration of a token, such as after a predetermined time period of inactivity associated with the token, after a predetermined time period after first generation, or after a threshold number of token uses has been met; publishing a robot program to the public through the community platform; etc.). However, any portion of processing a token can be performed at predetermined time intervals and/or at any suitable time and frequency (e.g., parallel processing of a plurality of tokens in batch to decrease computation time; processing tokens individually; etc.).

Processing a token S120 can additionally or alternatively include generating the token S122, which functions to create, select, and/or otherwise generate a token usable by users to download one or more robot programs identified by the token. Generating the token preferably includes applying computer-implemented token generation rules specifying one or more of: token format, how a token is generated (e.g., generated with a token generation model; randomly generated with a randomized algorithm; selection of natural language words from a library; token generation as a function of the robot operation states specified in the received robot program; etc.), when a token is generated (e.g., in response to identifying that a received robot program does not match any stored robot programs at the community platform), number of tokens generated, where a token is generated (e.g., at a programming interface versus a community platform), token uniqueness (e.g., globally unique token versus locally unique token, etc.) and/or any other suitable aspects of token generation. However, any suitable computer-implemented rules can be applied or omitted in token generation.

Generating a token can be based on one or more of: robot programs (e.g., robot operation states specified in the received robot program; other robot programs authored by the user, collaborators, subscribed channels, and/or other suitable entities; underlying code; etc.), user data (e.g., programming interests, location data, time of day, search history, program history, username, social networking information, etc.), user inputs (e.g., keywords entered by or selected by the user); application type (e.g., type of programming interface used in generating the relevant robot program), user privacy levels (e.g., the types of data collectable from the user), content databases (e.g., token content libraries; third party content sources such as databases associated with robot toy manufacturers or distributors; etc.), robot types (e.g., generating different token types for robot programs associated with a first robot type versus a second robot type), robot identifiers, sensor measurements (e.g., robot sensor measurements, user device sensor measurements, location measurements, etc.) and/or any other suitable criteria. Such criteria can be used to additionally or alternatively personalize the token (e.g., formulating the token to be specific to a user based on one or more user-related criteria). In a first example, generating the token can include: identifying an audio output robot operation state (e.g., play happy music) encoded in the received robot program; and selecting a word to be used for the natural language token, where the word is associated with the audio output state (e.g., "piano"). In a second example, the method 100 can include: receiving robot sensor measurements substantially concurrently with the robot program; and automatically generating the token based on the robot sensor measurements. Alternatively, generating the token can omit personalization of the token with respect to the user. For example, generating the token can include applying a randomized algorithm (e.g., randomly selecting natural language words from a natural language content library). However, personalizing tokens can be performed in any suitable manner.

Determining a token is preferably performed with a token generation model including any one or more of: probabilistic properties, heuristic properties, deterministic properties, and/or any other suitable properties, but any suitable models (e.g., blockchain models) can be used in generating a token. In a first variation, generating a token can be based on a token content library. Token content libraries preferably include content pieces that can be selected from in generating one or more tokens, but can additionally or alternatively include one or more: content piece tags (e.g., age range tags specifying the content piece's suitability for particular ages; content type tags specifying a sentiment, meaning, or conceptual area associated with the content piece; activity tags specifying frequency or amount of usage for the content piece; etc.), metadata tags (e.g., content piece type, creation timestamps, usage timestamps, creator, geographical origin, etc.), supplemental data tags, and/or any suitable data. Content pieces can be of any suitable type, including any one or more types analogous to token types described in relation to S120. Selecting content pieces to form a token can be performed using any approaches analogous to those described in relation to token generation models, and/or any suitable models. In an example, generating a token based on token content libraries can include: determining an age of the user who uploaded the robot program; selecting a natural language word from a natural language content library based on the age of the user (e.g., an age-appropriate word likely to be within the vocabulary of an average user of the age); selecting an emoji from an emoji content library based on the age of the user; and transforming the natural language word and the emoji into a token based on combining the natural language word and the emoji (e.g., appending the emoji to the end of the word; generating a graphical image with the emoji positioned below the word; etc.). However, generating tokens based on token content libraries can be performed in any suitable manner.

In a second variation, generating a token can be performed with a machine learning token generation model. For example, for a token type including a natural language word and an associated animal image (e.g., where a user is prompted to enter the natural language word and select an animal image to facilitate identification of the token and corresponding robot program while increasing token uniqueness), machine learning algorithms can be used to output a particular animal type personalized to the user. In a specific example, a machine learning token generation model can be trained with training samples including user data features (e.g., programming behavior such as coding a high percentage of movement robot operation states can indicate a preference for animals with high mobility; location; user preferences; etc.) and corresponding labels of different preferred animal types, which can be used in selecting a personalized animal image for the token. Token generation and/or other portions of the method 100 can employ any suitable machine learning approaches (e.g., supervised learning, unsupervised learning, deep learning, etc.). In a first specific example, generating a token can include training a neural network model (e.g., convolutional neural network model) for classifying physical objects present in graphical datasets (e.g., images recorded by optical sensors of the robot; favorite emojis used by the user; user personal device background images; recently watched videos; etc.) by using optical features (e.g., image pixel values) for the neural input layer; and generating the token based on the object classifications (e.g., classifying a brown dog in a test sample and generating a natural language token of "brown puppy"). In a second specific example, generating a token can include training a neural network model (e.g., generative neural network model, recurrent neural network model) with a plurality of natural language content pieces (e.g., text from a plurality of children's books); and generating natural language tokens for natural language phrases (e.g., three-word phrases derived from and/or similar to the text from the children's books) output by the neural network model. However, generating a token with machine learning models can be performed in any suitable manner.

In a third variation, different token generation models (e.g., generated with different algorithms, with different features, etc.) can be generated and/or executed based on one or more of: privacy level (e.g., generating personalized tokens for users associated with guardians who have given COPPA parental consent; generating randomized non-personalized tokens for users associated with guardians who have not given COPPA parental consent; etc.), user profiles (e.g., determining programming proficiency level of a user; selecting a natural language token generation model for proficiency levels falling below a threshold; selecting a programming input token generation model for proficiency levels exceeding the threshold; etc.), location data (e.g., location-based features such as popular destinations geographically proximal to the user's location, such as generating an "Eiffel Tower Shines" natural language token for a user based in Paris, etc.), user age data (e.g., a first token content library with content pieces appropriate for age range "5-8" versus a second content library appropriate for age range "9-12", etc.), robot sensor measurements (e.g., using a token generation model outputting animal-related tokens in response to receiving microphone data indicating animal noises, etc.), application type (e.g., using a graphical token generation model for robot programs developed with programming interfaces employing visual programming inputs; etc.), robot type (e.g., using token content libraries with content pieces, such as "launcher", associated with robot accessories, such as a ball launcher mounted to a robot associated with the received robot program), and/or any other suitable data. In an example, generating a token can include: determining a personalized token type based on processing a machine learning model with user data inputs for the user associated with the received robot program; and selecting a token generation model suited to outputting token content typifying the personalized token type. However, employing different token generation models can be performed in any suitable manner.

Figure 5:
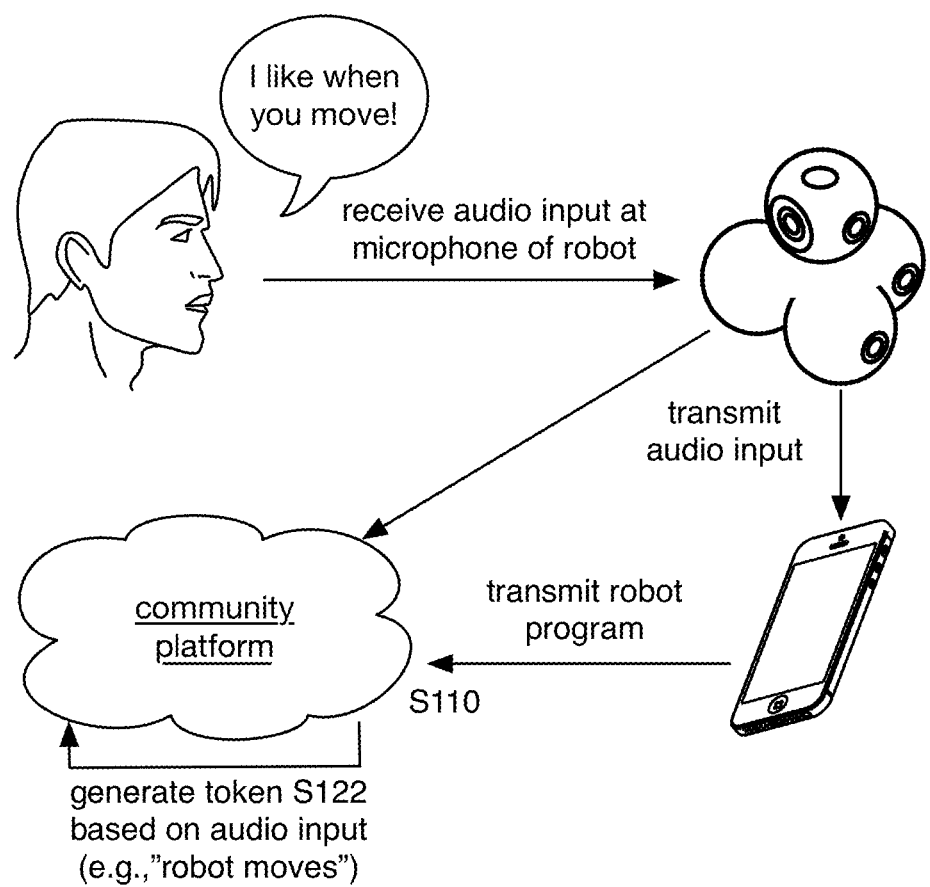
FIG. 5 is a schematic representation of generating a token in a variation of a method for sharing robot programs.
Figure 6:
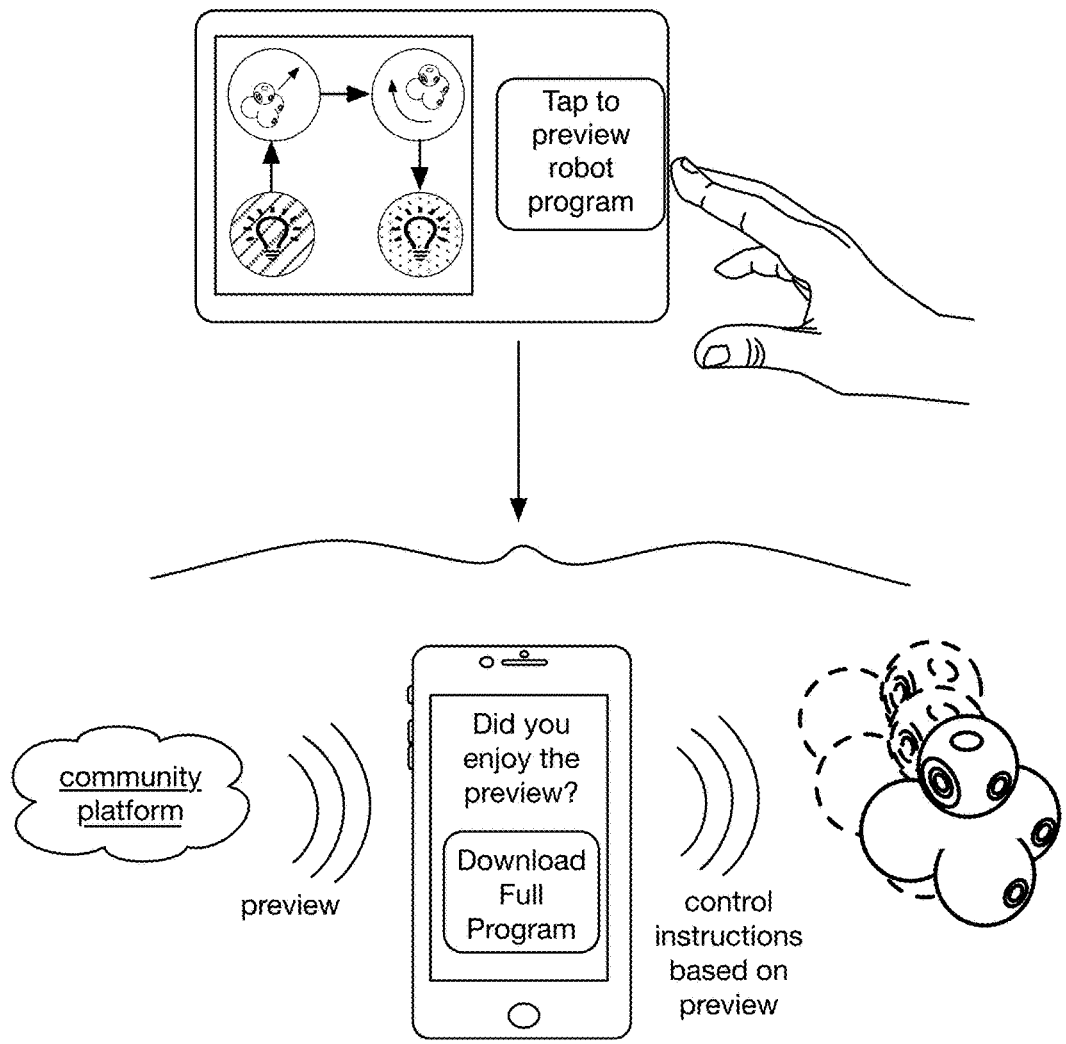
FIG. 6 is a schematic representation of implementing program previews in a variation of a method for sharing robot programs.

Generating a token can include generating a token typifying any suitable token types. In a first variation, a natural language token can be generated. The natural language token preferably includes one or more natural language words (e.g., a single word, phrase, sentence, etc.) in any suitable language, but can additionally or alternatively include any other suitable information (e.g., an associated audio clip associated with the natural language words). As shown in FIG. 3, the natural language words are preferably automatically selected from a natural language content library, but can additionally or alternatively be dynamically generated (e.g., with a generative text model), manually selected (e.g., by a user, by an administrator associated with the community platform), and/or otherwise determined. The natural language content library preferably includes natural language token generation rules that can specify one or more of: word limits (e.g., restricting natural language tokens to fewer than four words), parts of speech parameters, phrase templates, word content, word categories (e.g., animal-related words, vehicle-related words, action-oriented words, etc.), grammatical rules, language, punctuation, and/or other suitable parameters, but any suitable computer-implemented rules can be applied to natural language token generation. In a first example, generating a natural language token can include: identifying a user age (e.g., estimating a user age based on the complexity of the received robot program); and selecting, from a natural language content library, natural language words tagged with age ranges encompassing the user age. In a second example, generating a natural language token can include: selecting a phrase template specifying parts of speech restrictions for the word constituents in the phrase template (e.g., noun followed by verb followed by noun); selecting two nouns from a noun content library and a verb from a verb content library (e.g., selecting one subject noun, one verb, and one object noun, such as "bunny ate carrot"). In a third example, generating a natural language token can be based on the received robot program, where the method 100 can include: parsing the received robot program into robot operation states (e.g., a dancing robot operation state) coded by the robot program; and selecting words from the natural language content library (e.g., "dance") based on the robot operation states. In a fourth example, generating the natural language token can include: analyzing a user profile (e.g., identifying that a user likes cars from user post content at the community platform, from social media data, etc.); and generating the natural language token based on the user profile (e.g., selecting "car" for the natural language token, etc.). In a fifth example, as shown in FIG. 5, generating a token can be based on robot sensor measurements (e.g., selecting natural language words for the token based on words stated by the user and recorded by the robot microphone; selecting natural language words associated with emotions determined to be associated with music recorded by the robot microphone; etc.). However, generating a natural language token can be performed in any suitable manner.

In a second variation, a programming input token can be generated. The programming input token preferably includes one or more programming inputs (e.g., visual inputs, textual inputs) that a requesting user would enter (e.g., into a programming interface application) to download the corresponding robot program, but can include any suitable data. The programming inputs specified by the token preferably include one or more programming inputs in the received robot program (e.g., where the token can act as a preview of the robot program), but can include any suitable type of programming inputs. In a third variation, a token of multiple types can be generated (e.g., a token including a natural language phrase and a visual programming input corresponding to a robot operation state, etc.), but any suitable content can be combined to form a token.

Generating the token can additionally or alternatively include generating a unique token (e.g., globally unique; locally unique; etc.). A globally unique token is preferably generated for a single robot program and not reused for other robot programs, but can be otherwise defined. Locally unique tokens are preferably unique under certain conditions, which can vary based on one or more of: location (e.g., maintaining uniqueness tokens for robot programs originating from the United States; reusing a token for two different robot programs originating from two different countries; based on predetermined or dynamically determined geofences; etc.), time (e.g., maintaining uniqueness for a token for a predetermined or dynamically determined period of time, such as based on download activity associated with the token), robot type (e.g., maintaining uniqueness for robot programs developed for a particular robot type, but reusing tokens across robot types; etc.), robot program type (e.g., maintaining token uniqueness for robot programs developed for users within a certain age group; for robot programs at a certain difficulty level; for robot programs including specific robot operation states; etc.), user type (e.g., maintaining token uniqueness for users of a certain age; of a certain demographic; etc.), programming interface type; and/or any other suitable criteria, but locally unique tokens can be otherwise defined. Alternatively, a non-unique token can be generated. For example, a token can be generated for a plurality of robot programs (e.g., an original program and corresponding robot programs that are modifications of the original program), where a user entering the token can download any of the plurality of robot programs (e.g., presenting the plurality of robot programs to select from; automatically transmitting the plurality of robot programs; etc.).

Additionally, or alternatively, generating the token can include selecting between a unique token generation model and a non-unique token generation model, which can be based on any of the criteria described above in relation to locally unique tokens and/or token generation models. For example, the method 100 can include determining a privacy level associated with the first user (e.g., determining the types of personal information that can be collected in association with a user; identifying parental consent under COPPA; etc.), and selecting between a unique token generation model and a non-unique token generation model based on the privacy level (e.g., selecting a unique token generation model in response to identifying a restrictive privacy level, where supplementary user data is unavailable to use in resolving the token into the desired corresponding robot program; selecting a non-unique token generation model in response to identifying parental consent under COPPA; etc.). Additionally or alternatively, generating unique and/or non-unique tokens can be performed in any suitable manner. However, generating the token can be performed in any suitable manner.

Figure 18:
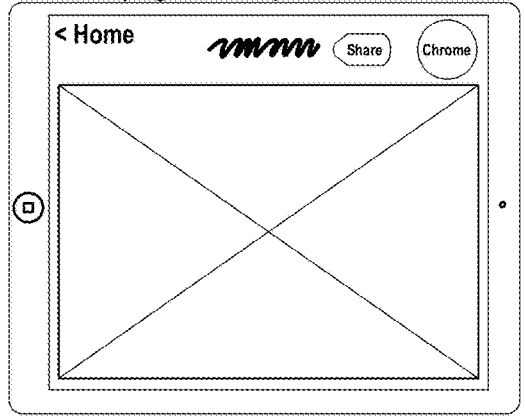
FIG. 18 is a schematic representation of processing tokens in a variation of a method for sharing robot programs.
Figure 18:
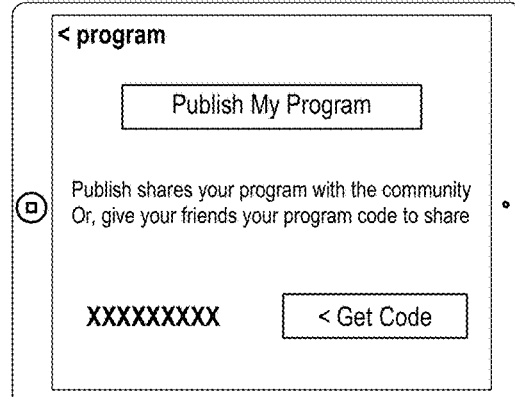
Figure 18:
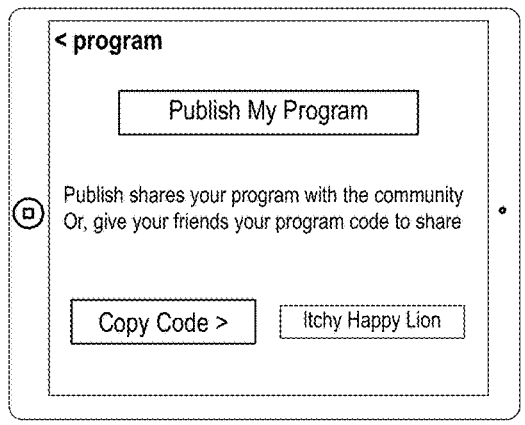
Figure 18:
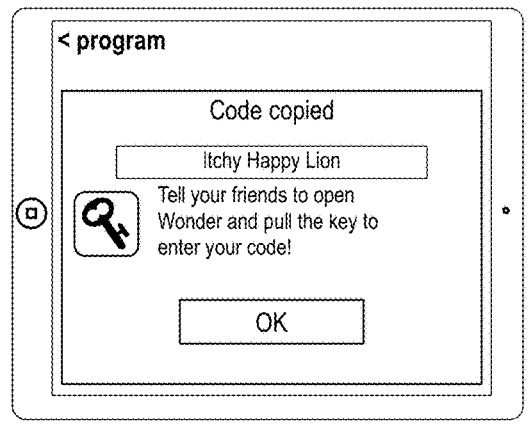
Figure 19:
FIG. 19 is a schematic representation of processing tokens in a variation of a method for sharing robot programs.
Figure 20:
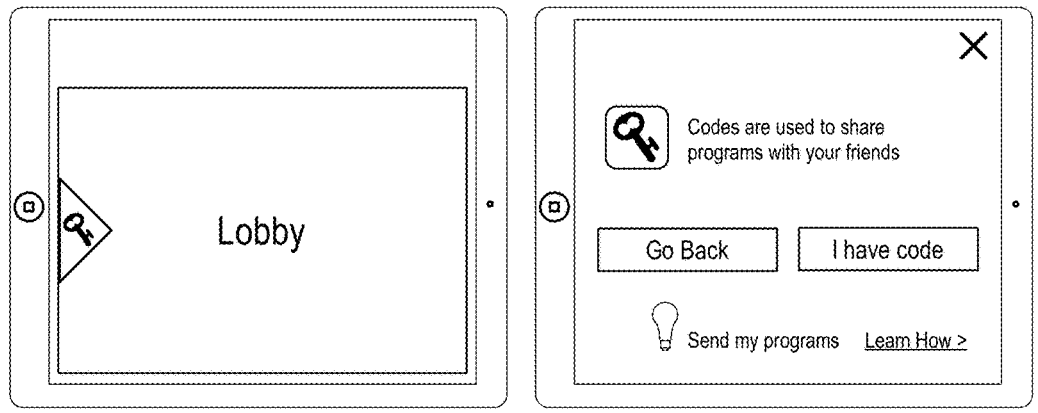
FIG. 20 is a schematic representation of processing a program request in a variation of a method for sharing robot programs.
Figure 20:
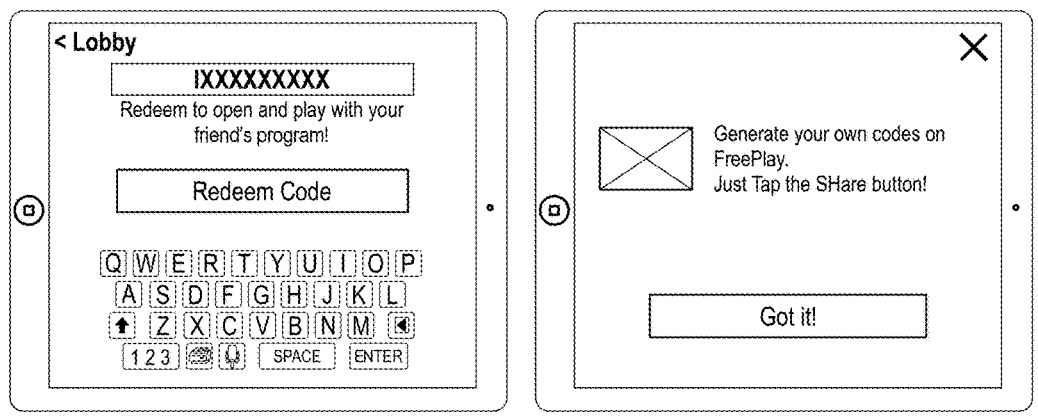
Figure 20:
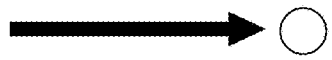

Processing the token S120 can additionally or alternatively include sharing the token S124, which functions to present one or more generated tokens to one or more: users (e.g., the user uploading the robot program identified by the token; friends of the uploading user; collaborators; etc.), associated entities (e.g., guardians, educators, care providers, etc.), and/or any other suitable entities, as shown in FIGS. 18-20. Sharing the token preferably includes transmitting the token to the user at the component used to upload the robot program. For example, the method 100 can include: receiving a robot program from a programming interface executing at a user device; generating a token for the robot program; and presenting the token to the user at the programming interface. Additionally or alternatively, the token can be transmitted to any suitable components (e.g., to the robot to be displayed at the graphical display of the robot, where the robot can concurrently perform an action such as emitting confirmatory audio, etc.). In a first variation, sharing the token can include sharing the token to channel subscribers (e.g., identifying subscribers to a robot program channel associated with the user who uploaded the robot program; and transmitting the token to user devices associated with the subscribers). In a second variation, the uploading user can select one or more users (e.g., substantially concurrently with uploading the robot program) for transmission of the token. In a third variation, sharing the token can include publishing the token at a browser of the community platform (e.g., where users can preview the robot program identified by the token). Sharing the token is preferably performed in response to generating the token but can additionally or alternatively be performed in response to another trigger event (e.g., a user request for the token, etc.). However, any number of tokens can be shared at any suitable time, and sharing the token can be performed in any suitable manner.

Processing tokens S120 can additionally or alternatively include associating one or more tokens with supplementary data S126, which functions to generate associations that can be used in resolving tokens into robot programs (e.g., associating a locally unique token with supplementary location data to compare to a requesting user's location data for selecting a robot program out of a plurality of robot programs corresponding to the locally unique token), facilitating robot program discovery (e.g., associating a token with a robot program type that can be used to identify recommended programs sharing the robot program type), analyzing efficacy of token generation (e.g., associating the token with a model identifier identifying the token generation model used in generating the token; surveying the user regarding the token such as asking whether the user likes the token; and analyzing the token generation model based on identification of the model through the association; etc.), generating and/or updating user profiles, operating robots (e.g., associating the token with a robot operation state; and controlling a robot associated with a requesting user to operate according to the robot operation state in response to transmitting the robot program to a user device associated with the requesting user; etc.), and/or for any other suitable purpose.

Associating the token preferably includes storing the token in association with the supplementary data at a database of the community platform, but can include any other suitable operation. Supplementary data can include any one or more of: robot programs (e.g., modifications of the robot program corresponding to the token; similar robot programs; recommended robot programs associated with the robot program; etc.), user data (e.g., name, physical or digital address, online contact information such as online usernames, telephone, website cookies, photos, video, audio, etc.), robot data (e.g., sensor data, robot operation states, etc.), user device data, token generation data (e.g., token generation models, token generation rules, etc.), associated identifiers (e.g., robot program identifiers; user identifiers identifying users with permitted access to the tokens, such as only associating the token with the user identifier identifying the user who uploaded the robot program; application identifiers identifying programming interfaces; etc.), and/or any other suitable data.

In a variation, the method 100 can include disassociating the token from the robot program and/or supplementary data. Token disassociation can be based on one or more of: temporal parameters (e.g., disassociating the token from a robot program after a predetermined or dynamically determined period of time), activity parameters (e.g., disassociating the token from the robot program in response to a zero downloads within a time period), data receipt parameters (e.g., disassociating the token from historic location data in response to receiving updated location data associated with the user), uniqueness parameters (e.g., disassociating the token from the robot program in response to generation of a token sharing the same content), robot program modification parameters (e.g., disassociating a token from a modification of a robot program in response to deletion of the original robot program, which can be identified by the same token or a different token, etc.), and/or any other suitable parameters. Additionally or alternatively, disassociating tokens can be performed in response to other trigger events (e.g., manual user request to delete the robot program from the community platform), at predetermined times (e.g., predetermined expiration dates) and/or at any suitable time and frequency. In an example, the method 100 can include: disassociating a token from a first robot program (e.g., after an expiration date); tagging the token as available; and selecting the token to associate with a second robot program. However, associating or disassociating tokens with supplementary data can be performed in any suitable manner.

Processing a token S120 can additionally or alternatively include generating a secondary identifier for the robot program S128, which functions to generate a supplemental identifier (e.g., an identifier internally used by the community platform) that can be used in resolving a token into a robot program, tracking program versioning, generating community platform analytics, and/or for any other suitable purpose. Generating the secondary identifier (e.g., a globally unique secondary identifier) can be based on any one or more of: a randomized algorithm, a blockchain algorithm, the robot program identified by the token (e.g., one or more programming inputs specified by the robot program, etc.), supplementary data, and/or any other suitable data. Additionally or alternatively, any number of identifiers can be generated for the robot program and/or associated with the robot program in any suitable manner. However, processing tokens can be performed in any suitable manner.

Processing a program request for the robot program based on the token S130 functions to identify one or more robot programs corresponding to the request in order to transmit the one or more robot programs to the requesting device. Processing a program request can additionally or alternatively include: mapping the program request to a robot program S132; sharing the robot program S134; and/or any other suitable functionality.

The program request preferably includes one or more tokens, but can additionally or alternatively include supplemental data (e.g., where the supplemental data can be matched to supplemental data stored in association with a stored token to identify a robot program associated with a locally unique or non-unique token, etc.) and/or any other suitable data (e.g., received substantially concurrently with the tokens). For example, the request can include user data from the requesting user (e.g., a list of users and/or user devices to share the robot program with; user preferences specifying whether to receive robot program recommendations in response to the request; a downloading preference such as a selection of a robot storage folder or user device storage folder into which the robot program can be downloaded; a robot program preview preference to download a preview of the robot program rather than the full robot program; etc.). Processing a program request is preferably performed at the community platform (e.g., where robot programs from a plurality of users are stored in associated with corresponding tokens), but portions of processing a user program request can additionally or alternatively be performed at any suitable components (e.g., robot, programming interface, user device, etc.). Processing a program request is preferably performed in response receiving a program request (e.g., upon a user inputting a token; upon a user manually selecting an option from a robot program browser to download a robot program; etc.), which can be from a user device, programming interface, robot, and/or any other suitable component, but processing a program request can be performed in response to other trigger events and/or at any suitable time and frequency (e.g., parallel processing of program requests in batch; processing program requests individually; etc.).

Processing a program request S130 can additionally or alternatively including mapping the program request to a robot program S132, which functions to resolve the program request (e.g., an included token) into one or more corresponding robot programs. Mapping the program request to a robot program preferably includes determining one or more identifiers based on one or more tokens. In a first variation, mapping the token can include determining a robot program identifier associated with the token. For example, the method 100 can include: storing a token (e.g., natural language token) in association with a robot program identifier identifying the robot program; receiving the token from a requesting user device; generating an analysis of the token (e.g., parsing a received natural language token into a plurality of natural language words); retrieving the first program identifier based on the analysis (e.g., a string match between the plurality of natural language words and stored natural language words from the stored natural language token, where the string match can be within a predetermined threshold similarity to accommodate for typographical errors or be an exact match; identifying robot actions or code snippets pre-associated with each natural language word and identifying robot programs including the robot actions or code snippets; etc.); and retrieving the robot program based on the program identifier. In a second variation, mapping the token can include determining a user identifier (e.g., where every user has their own unique token associated with each of the user's robot programs) associated with the token, where the user identifier can be mapped to one or more robot program identifiers. In an example of the second variation, the method 100 can include: receiving a plurality of robot programs from a first user identified by a first user identifier; associating each robot program of the plurality with either a "shareable" or "private" status based on user preferences; receiving a token from a second user; mapping the token to the first user identifier; and identifying and sharing, from the plurality of robot programs, robot programs possessing a "shareable" status. However, a token can be mapped to any suitable identifiers and/or data leading to identification of a suitable robot program to be shared.

In a first variation, mapping a token can include mapping a globally unique token. In this variation, mapping the received globally unique token can include comparing the received token to stored tokens; and selecting the robot program identified by the stored token matching the received token (e.g., where the stored tokens are generated with token generation rules specifying generating globally unique tokens for each robot program, etc.). However, resolving globally unique tokens can be performed in any suitable manner.

In a second variation, mapping a token can include mapping a locally unique token, which can be based on one or more of: token content (e.g., content pieces included in the token), token type, programming interface type, user data, robot data, other suitable parameters analogous to those described in relation to generating locally unique tokens, and/or any other suitable data. In a first example, the method 100 can include: storing a first locally unique token in association with a first robot program and first user location data (e.g., GPS coordinates of a first user device uploading the robot program; a first assigned geofence; etc.); storing a second locally unique token in association with a second robot program and second user location data (e.g., GPS coordinates of a second user device; a second assigned geofence), where the first and second locally unique tokens share the same token content (e.g., both are "cow eats grass" natural language tokens); receiving a program request including a token specifying the same token content (e.g., "cow eats grass") along with requester location data (e.g., GPS coordinates of the requesting user device); and mapping the token to either of the first robot program and the second robot program based on a comparison between the requester location data to the first and second user location data (e.g., choosing the robot program associated with the location data indicating a geographical location closer in proximity to the requester location; choosing the robot program associated with a geofence encompassing the requester location, etc.). In a second example, the method 100 can include: associating a received robot program with a stored token and a first application identifier (e.g., identifying an application used to generate the robot program; identifying a first programming interface enabling visual programming inputs; etc.); receiving a program request including a token and a second application identifier (e.g., identifying an application executing on the requesting user device; identifying a second programming interface enabling textual programming inputs; etc.); and mapping the request to the robot program based on a first match between the stored token and the token (e.g., both tokens include a graphical image of a bear), and a second match between first and the second application identifiers (e.g., both application identifiers identify a same programming interface). In a third example, mapping a locally unique token can include: associating a received robot program with a stored token and stored robot data (e.g., robot operation states included in the robot program; accessory and/or robot types required to execute the robot program; etc.); receiving a request including a token and requester robot data (e.g., robot type; accessories mounted to the robot; historic robot operation states; number of robots; etc.) describing one or more robots associated with the requesting user; and mapping the locally unique token based on a comparison between the stored robot and the requester robot data. However, mapping a locally unique token can be performed in any suitable manner.

Figure 4:
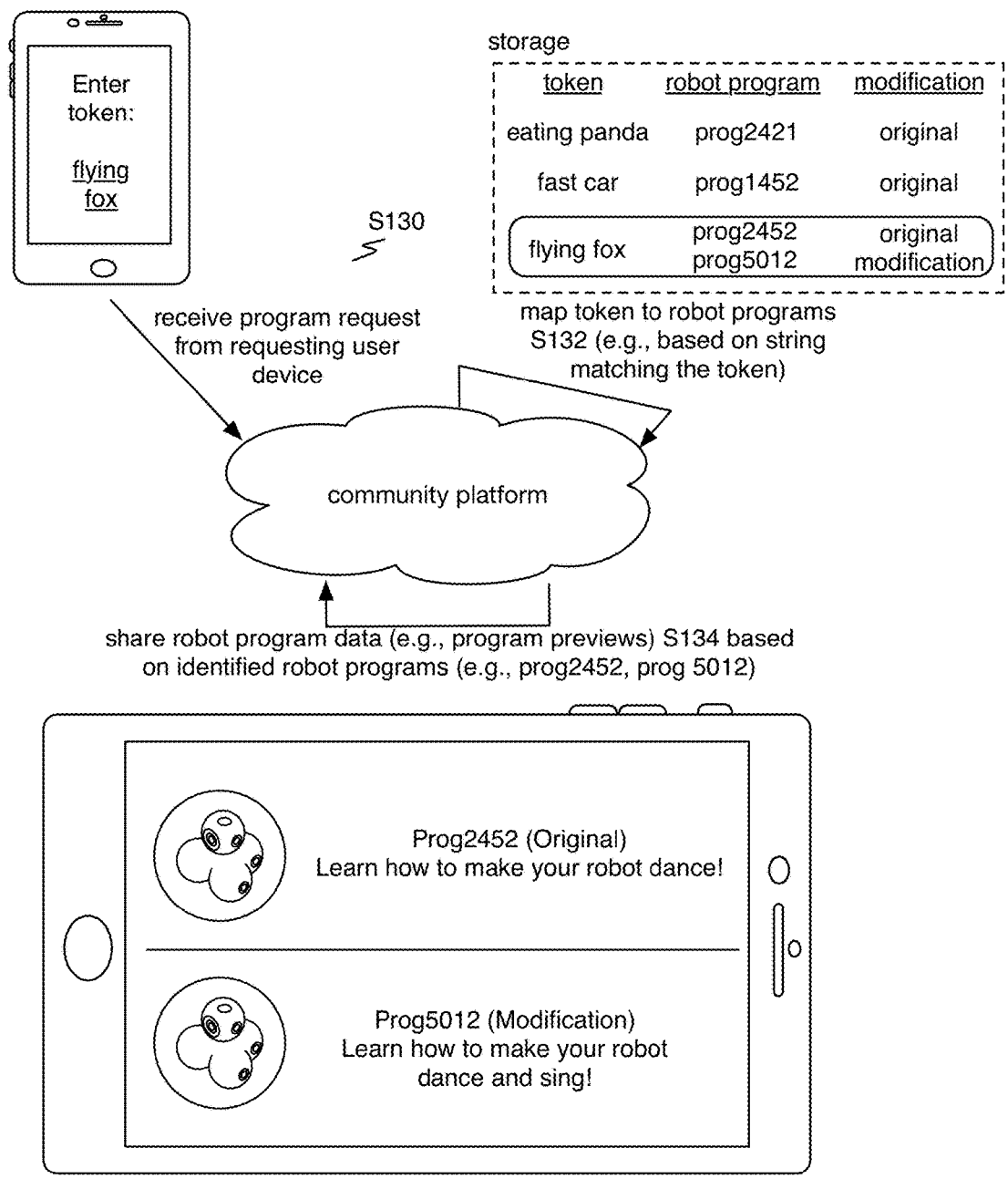
FIG. 4 is a schematic representation of resolving program requests in variations of a method for sharing robot programs.

As shown in FIG. 4, in a third variation, mapping a token can include mapping a non-unique token, which can be based on any suitable data described above in relation to mapping locally unique tokens, and/or any other suitable data. In a first example, mapping a non-unique token can include: mapping a received token to one or more robot operation states (e.g., by parsing a natural language token into individual words, and mapping a word to a robot operation state, such as mapping "laugh" to an audio output robot operation state; etc.); identifying stored robot programs at the community platforms based on the one or more robot operation states (e.g., robot programs with code completely matching or partially matching the code corresponding to the one or more robot operation states, etc.), where each of the identified robot programs can be subsequently shared, or a robot program of the identified robot programs can be selected based on other suitable data (e.g., the requesting user's personal library of robot programs). In a second example, mapping a non-unique token can include: associating a received robot programs with a non-unique token and sets of supplementary data associated with the robot program uploaders (e.g., user data such as age, programming proficiency, programming behaviors; robot data such as recent sensor measurements, robot type, robot accessories; other suitable supplementary data; etc.); receiving a request including requester supplementary data and a token matching the non-unique token; determining a set of similarity scores between the requester supplementary data and the sets of supplementary data; and mapping the token to the robot program associated with the supplementary data with the highest similarity score to the requester supplementary data. In a third example, the method 100 can include: associating a non-unique token with a plurality of robot programs (e.g., and/or robot program identifiers); receiving the non-unique token from a requesting user device; mapping the non-unique token to the plurality of robot programs; and presenting the plurality of robot programs at the requesting user device. However, mapping non-unique tokens can be performed in any suitable manner.

In a fourth variation, multiple tokens (e.g., token parts) can be mapped to a single robot program (e.g., distributing separate token parts to different users collaborating on a collaborative robotics challenge, where each user has to transmit a separate token part within a predetermined time period of each other in order to receive a reward robot program). However, any number of tokens can be mapped to any number of robot programs in any suitable manner.

Processing a program request S130 can additionally or alternatively include sharing the robot program S134, which functions to transmit the robot program and/or robot program-related data to a user device (e.g., the user device that transmitted the robot program request) associated with the requesting user. Sharing a robot program is preferably in response to identifying the robot program corresponding to a received token, but can be performed in response to other trigger events (e.g., a user selecting a "Download" button associated with a preview of a published robot program; detecting an inactive robot operation state; etc.), at predetermined times (e.g., times when the user is likely sleeping, etc.), and/or at any suitable time and frequency. In a first variation, sharing the robot program can include transmitting the robot program from storage of the community platform to the requesting user device. In a second variation, sharing the robot program can include transmitting the robot program from a first robot to a second robot (e.g., through a wireless communication channel). In variations, sharing a robot program S130 can be performed in analogous manners to sharing a token S124, but can otherwise be performed. However, processing a program request can be performed in any suitable manner.

The method 100 can additionally or alternatively include controlling one or more robots based on the robot program, which functions to operate the robot according to the robot program (e.g., according to the programming inputs specified in the robot program). Controlling a robot preferably includes generating robot control instructions (e.g., at a programming interface executing on a user device and/or robot); transmitting the robot control instructions to the robot (e.g., from a user device to a wireless communication module of the robot); and operating the robot according to the control instructions (e.g., executing the control instructions with a processing unit of the robot). Additionally or alternatively, controlling a robot can be performed in any manner analogous to U.S. application Ser. No. 14/737,342 filed 11 Jun. 2015, and U.S. application Ser. No. 15/260,865 filed 9 Sep. 2016, each of which are in their entirety by this reference. However, controlling a robot can be performed in any suitable manner.

The method 100 can additionally or alternatively include recommending a robot program S150, which functions to present one or more robot programs tailored to the user and downloadable by the user. As shown in FIGS. 6, 10, 13, and 25, recommending a robot program preferably includes presenting a program preview (e.g., describing the contents of the robot program) of the recommended robot program, where the robot program preview can include any one or more of: robot operation previews (e.g., options to preview a subset of robot operation states specified in the robot program by operating a robot according to the subset of robot operation states), textual data (e.g., title, description, version, creation date, reviews, compatibility parameters, etc.), graphical data (e.g., images, video, 3D elements, holographic elements, etc.), audio data, tactile data, and/or any other suitable data. In an example, the method 100 can include: generating a program preview based on a robot program (e.g., a robot program selected for recommendation to a user), the program preview including a robot operation state encoded in the robot program; receiving a request from a user (e.g., different from the user who uploaded the robot program) for the program preview; and in response to receiving the request, controlling a robot associated with the user to operate according to the robot operation state. Additionally or alternatively, recommending a robot program can include automatically transmitting the robot program to the requesting device and/or any other suitable devices (e.g., each of the user devices associated with a family of users of robots; selectable by the user; etc.), but can include any suitable functionality.

Recommending a robot program is preferably based on inputs including one or more of: robot program data (e.g., robot programs associated with the user for whom recommendations are being generated; associated with users related to friends lists, subscriptions, channels, social media, and/or other suitable users; received robot programs; stored robot programs; robot operation states, programming inputs, and/or other robot program data associated with the robot program; etc.), user data (e.g., tracking user behavior at the community platform and/or programming interfaces, such as tracking visits to robot program previews, session times with different robot programs, programming behavior, etc.), robot data (e.g., robot sensor measurements, user-robot interactions, frequency of robot outputs for different output types such as motion versus audio, etc.), privacy level, and/or any other suitable criteria.

Figure 8:
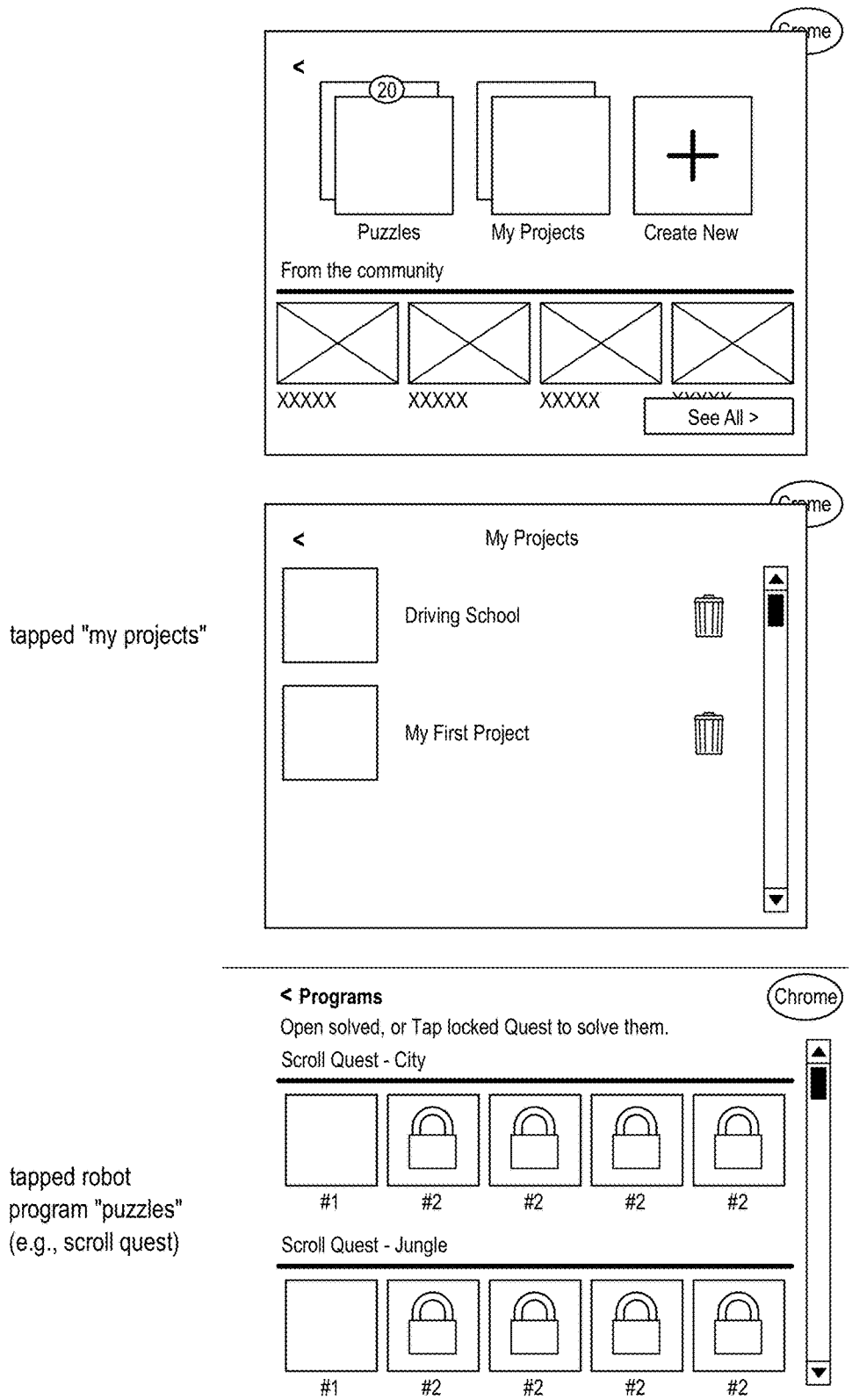
FIG. 8 is a schematic representation of a variation of a robot program browser.

As shown in FIG. 3, in a first example, recommending a robot program can be based on a program analysis of a received robot program (e.g., uploaded to the community platform), where recommendation can include: in response to receiving the robot program from the user, generating an analysis of the robot program; selecting a recommended program for the user based on the analysis of the robot program; and presenting the recommended program to the user at a user device. The program analysis can include any one or more of: robot program comparisons between the received robot program and stored robot programs at the community platform (e.g., for the received robot program, calculating a percentage of programming inputs and/or robot operation states matching and/or similar to those included in the stored robot programs; ranking robot programs based on similarity scores calculated based on matching robot program data; recommending in response to similarity scores or other metrics exceeding predetermined or dynamically determined thresholds; comparing other robot program data such as age appropriateness, difficulty, author, creation date, popularity, whether the robot program is a modification of an original program or of another modification, and/or other suitable robot program data), robot program comparisons between the received robot program and other robot programs associated with the user (e.g., authored by the user, by users associated with friends lists, subscriptions, channels, etc.), and/or any other suitable criteria. In a specific example, recommending a robot program based on a program analysis can include: identifying a robot-robot interaction state (e.g., specifying the manner in which a robot interacts with another robot) encoded in the received robot program; and selecting a recommended program based on the first robot-robot interaction state, where the recommended program encodes a second robot-robot interaction state (e.g., matching the first robot-robot interaction state; similar to the first robot-robot interaction state; sharing the same type of robot-robot interaction state, etc.). In another specific example, selecting robot program recommendations can be based on identifying stored robot programs including complementary robot operation states and/or programming inputs to those included in the received robot program (e.g. obstacle avoidance programming inputs complementary to robot operation states of robot movement through a crowded environment; drive in a figure-8 robot operation states complementary to dancing robot operation states; etc.). However, recommending robot programs based on the received robot program can be performed in any suitable manner.

In a second example, recommending a robot program can be based on robot data. In a specific example, the method 100 can include: receiving a robot profile including robot data for the robot (e.g., substantially concurrently with receiving the robot program; in response to a user request for recommendations; etc.), the robot profile specifying robot functionality (e.g., accessories mounted to the robot; sensors available at the robot; output types associated with the robot; communication modules; etc.); and recommending robot programs based on the robot functionality (e.g., robot programs including robot operation states using the accessories, sensors, output types, and/or communication modules, etc.). However, recommending robot programs based on robot data can be performed in any suitable manner.

Figure 12:
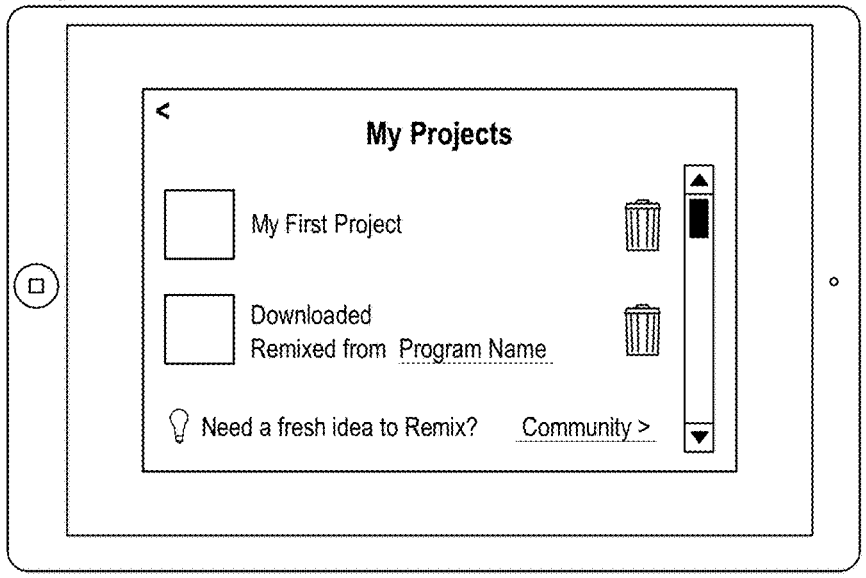
FIG. 12 is a schematic representation of variations of robot program browsers.
Figure 12:
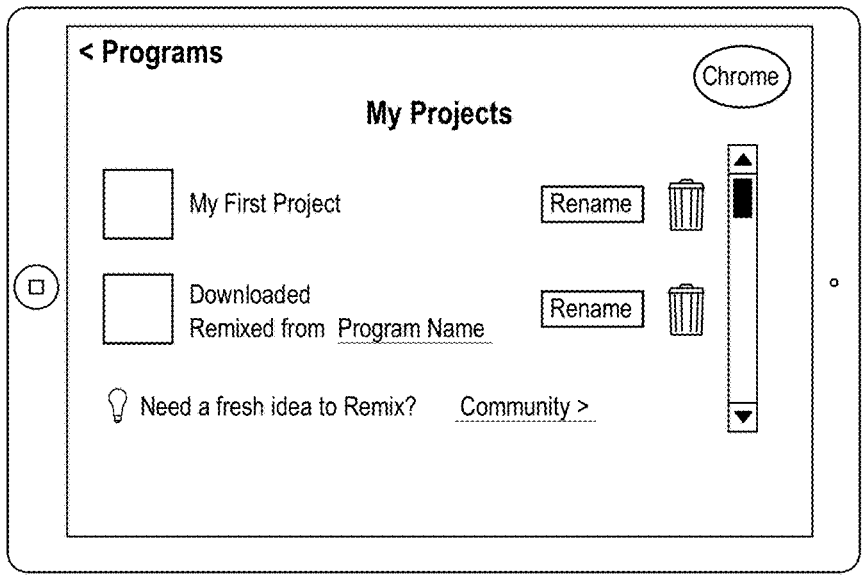
Figure 13:
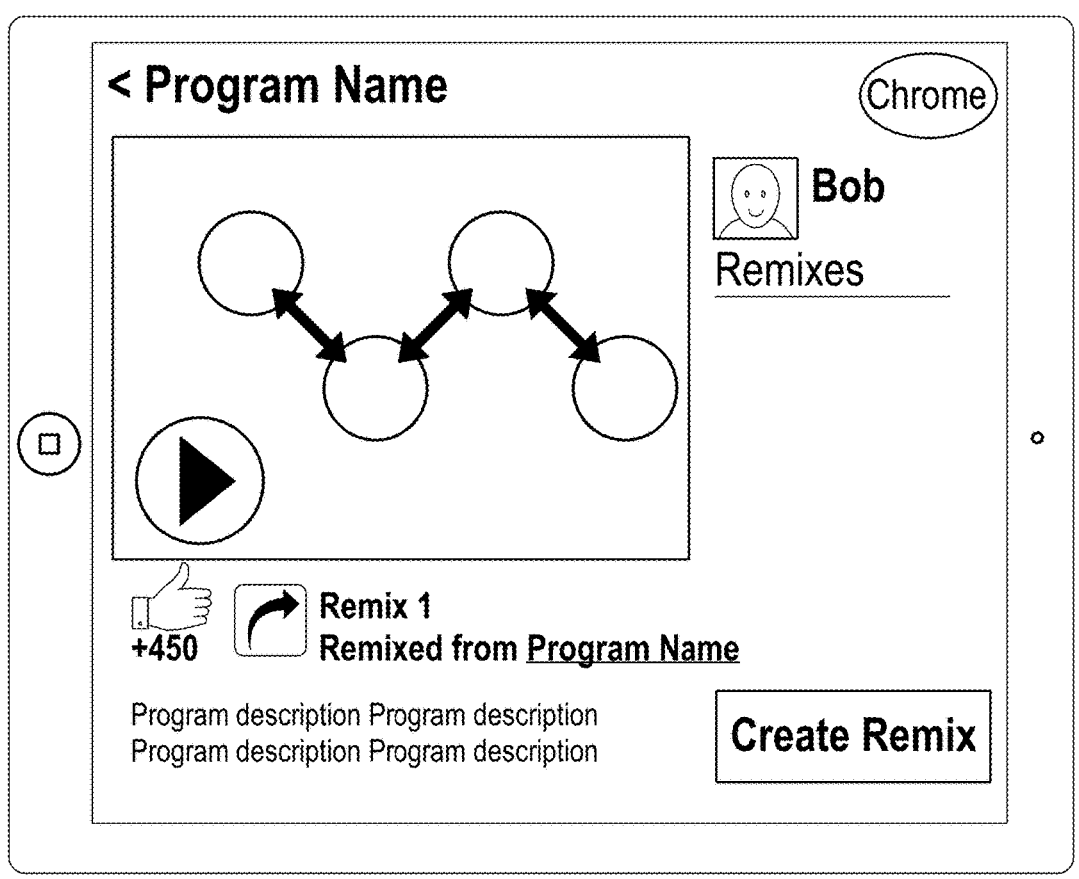
FIG. 13 is a schematic representation of a variation of a program preview.

In a third example, recommending a robot program can be based on user data. In a specific example, the method 100 can include: evaluating a programming proficiency for a user (e.g., based on parsing robot programs in the user's robot program library, such as the robot program library shown in FIGS. 8 and 12; performance on robot program puzzles; age; community platform activity such as number and difficulty of downloaded robot programs; robot program homework scores; breadth and depth of familiarity with robot functionality; etc.). However, recommending robot programs based on user data can be performed in any suitable manner.

Recommending a robot program is preferably performed with a program recommendation model usable with one or more inputs described above to output one or more robot program recommendations (e.g., robot program identifiers identifying the recommended robot programs and/or robot program previews). The program recommendation model can employ any approaches and algorithms analogous to those described in relation to the token generation model, but can be otherwise configured. In a first variation, program recommendation models can be used in parsing robot programs to perform robot program data comparisons (e.g., for programming inputs, robot programming logic, robot outputs, etc.) between the robot programs. In a second variation, program recommendation models (e.g., machine learning program recommendation models) can be improved over time (e.g., retrained) based on user data (e.g., user actions) in relation to recommended robot programs (e.g., actively and/or passively obtained user feedback, such as user ratings for the recommended robot programs; browsing for other robot programs in response to receiving the robot program recommendations; user previewing, downloading, sharing, and/or modifying the recommended robot program or unrelated robot program; session time with the recommended robot programs; etc.).

Any number of robot programs can be recommended in any suitable manner. For example, the method 100 can include: publishing a robot program puzzle; receiving an incomplete robot program response (e.g., a partial solution to the puzzle) to the robot program puzzle; comparing the robot program response to a puzzle solution to identify a robot operation state (e.g., and/or associated programming inputs) present in the puzzle solution and absent in the robot program response; and recommending a plurality of stored robot programs based on the robot operation state (e.g., each of the stored robot programs including the robot operation state; ranking from similarity score; threshold number of matching programming inputs associated with the robot operation state; a first stored robot program including programming inputs associated with a portion of the robot operation states, a second stored robot program including programming inputs associated with a remaining portion of the robot operation state; etc.). In another example, the number of recommended robot programs can be determined based on confidence levels for how likely a user is to perform a particular action in relation to a recommended robot program (e.g., tap the associated robot program preview; download, execute, modify, and/or share the recommended robot program; etc.), where the confidence levels can be determined based on any one or more of: robot program comparisons (e.g., similarity scores based on number of matching programming inputs between recommended robot programs and a user's library of robot programs, etc.), historically recommended robot programs (e.g., threshold percentage of historically recommended robot programs that the user has performed the particular action on, etc.), user data (e.g., age, community platform activity, etc.), and/or any other suitable criteria. However, confidence levels can be generated in any suitable manner and used for any suitable purpose (e.g., recommending a robot program through the robot program browser versus recommending a robot program in response to receiving an uploaded robot program, etc.).

Figure 11:
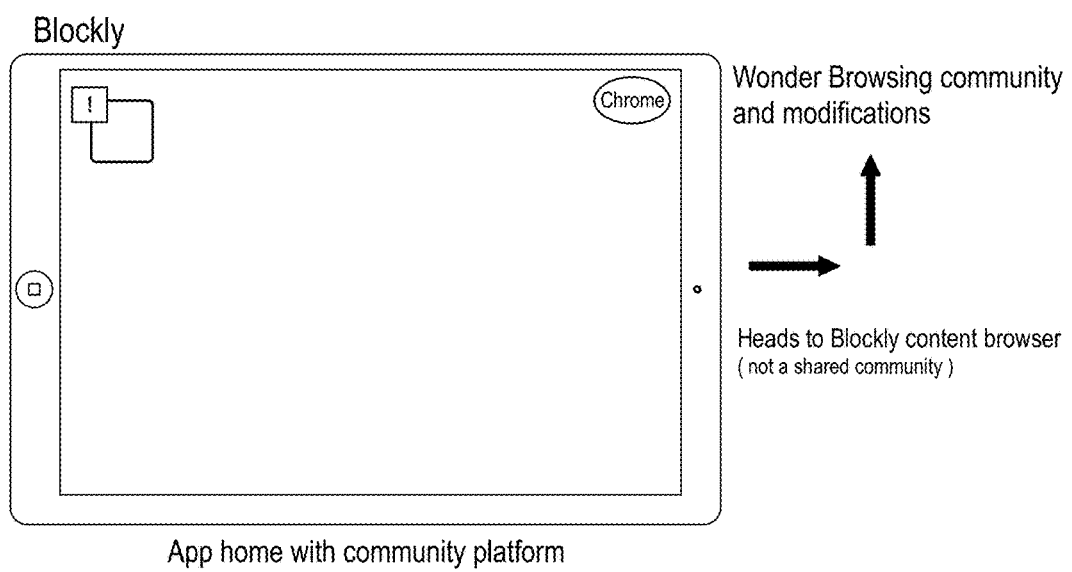
FIG. 11 is a schematic representation of a variation of a community platform.

Recommending robot programs is preferably performed by a community platform (e.g., executing on a remote computing system; accessible by the programming interfaces, user devices, robots, and/or other suitable components, as shown in FIG. 11; etc.) storing robot programs and/or associated robot program data, but can additionally or alternatively be performed by any suitable components. Recommending a robot program can be performed in response to and/or substantially concurrently with any one or more of: receiving a robot program (e.g., uploaded to the community platform), user coding and saving of robot program (e.g., at a programming interface), receiving user requests for robot programs (e.g., users performing searches at the community platform; updating user content feeds at the community platform; etc.), and/or other suitable trigger events. However, recommending robot programs can be performed at any suitable time.

Figure 15:
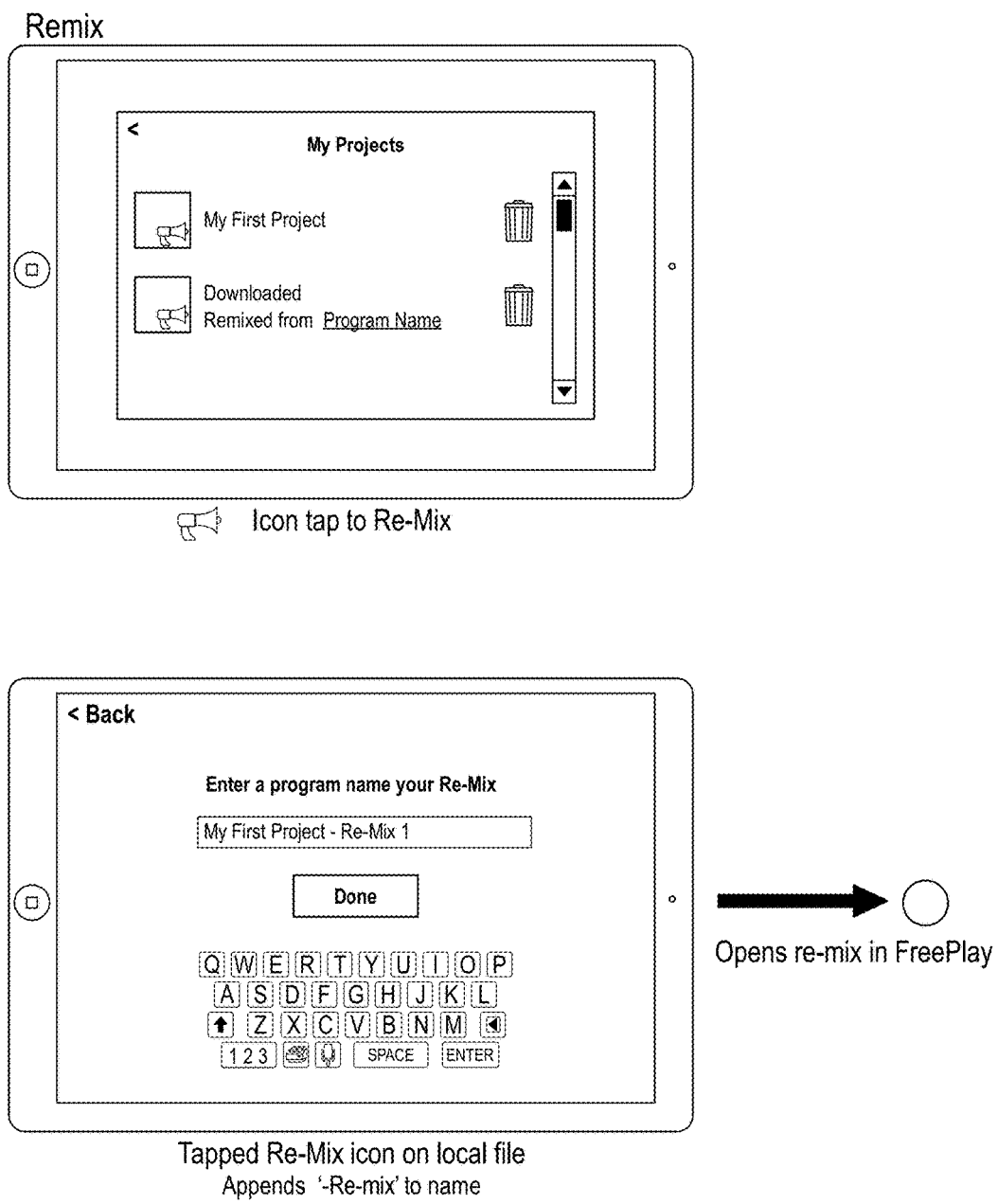
FIG. 15 is a schematic representation of processing modifications in a variation of a method for sharing robot programs.
Figure 21:
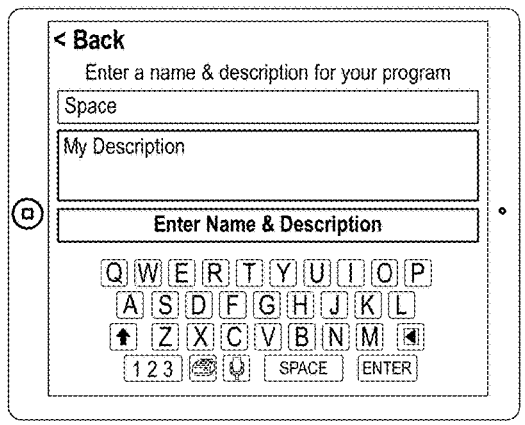
FIG. 21 is a schematic representation of publishing a robot program in a variation of a method for sharing robot programs.
Figure 21:
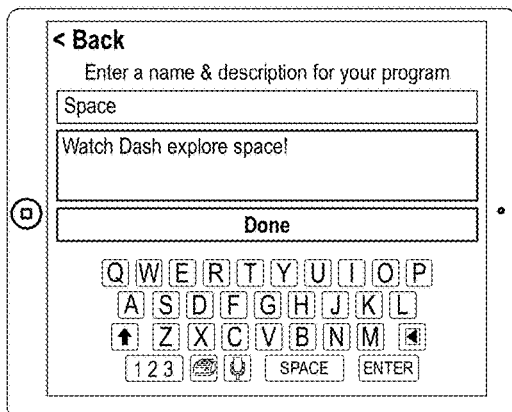
Figure 21:
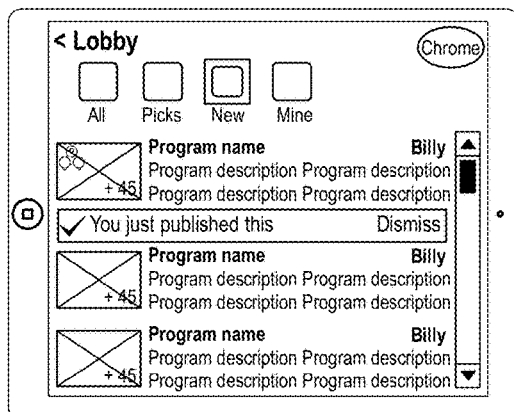
Figure 21:
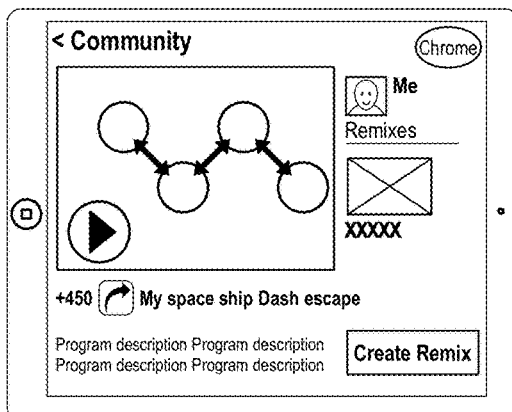
Figure 22:
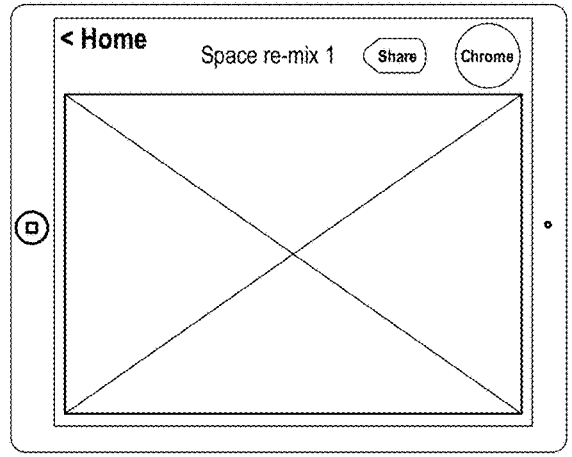
FIG. 22 is a schematic representation of publishing a robot program in a variation of a method for sharing robot programs.
Figure 22:
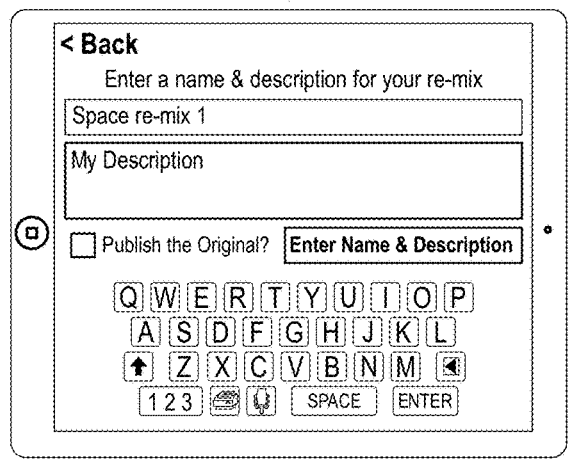
Figure 22:
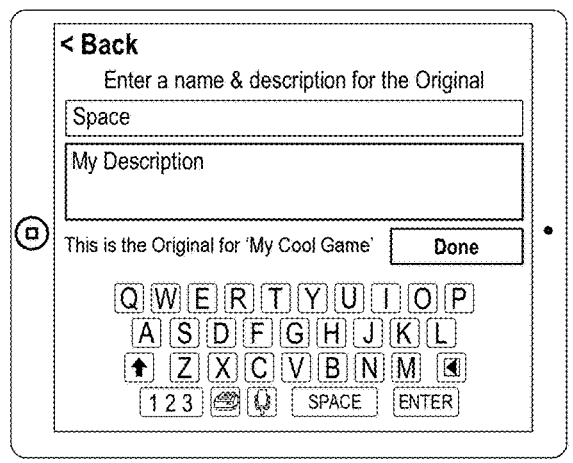
Figure 24:
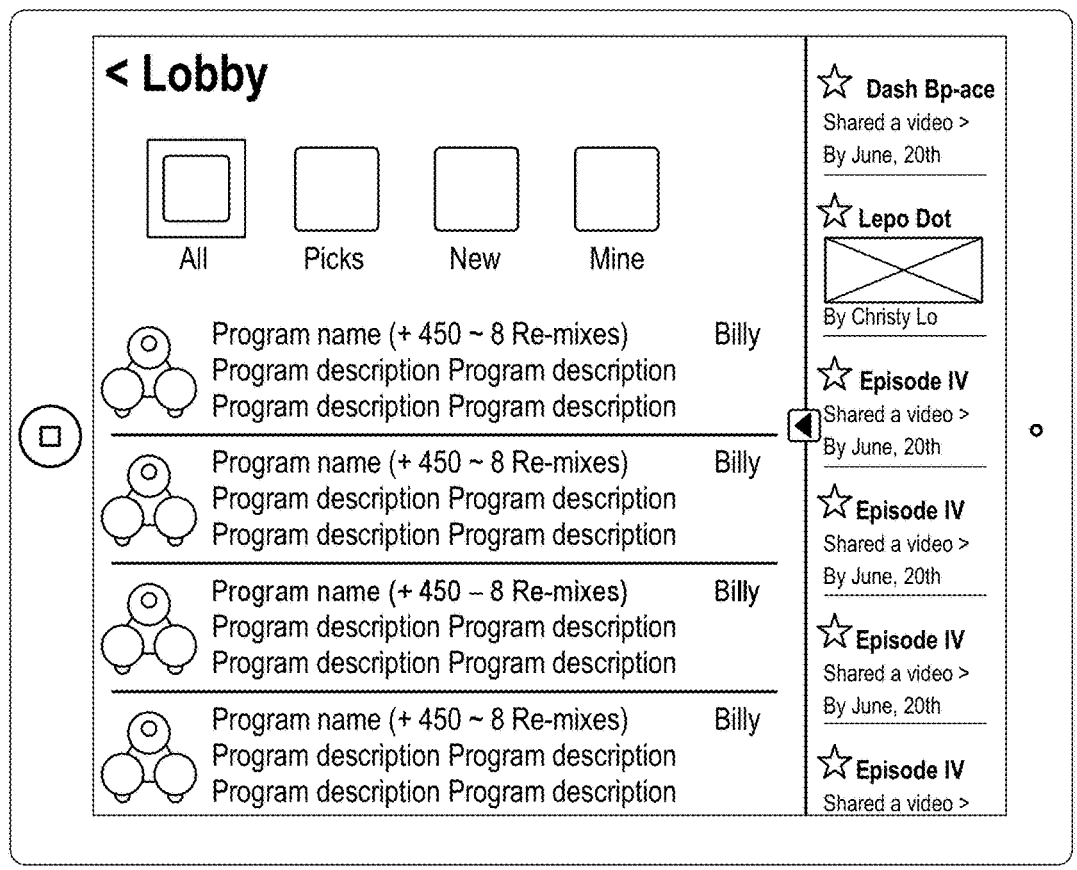
FIG. 24 is a schematic representation of a variation of a content feed at a community platform.
Figure 25:
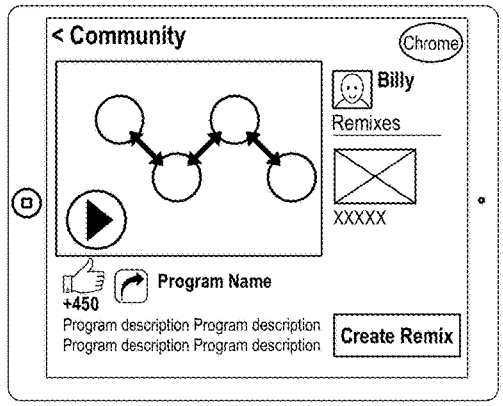
FIG. 25 is a schematic representation of a variation of a program preview.
Figure 25:
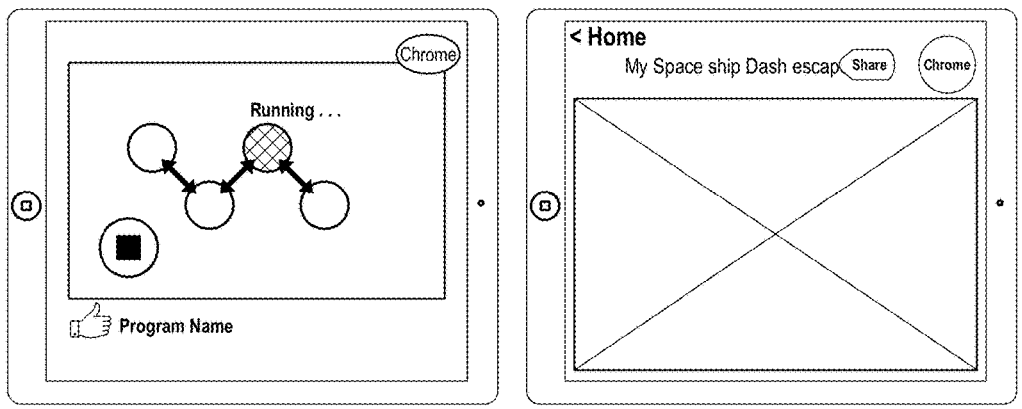
Figure 26:
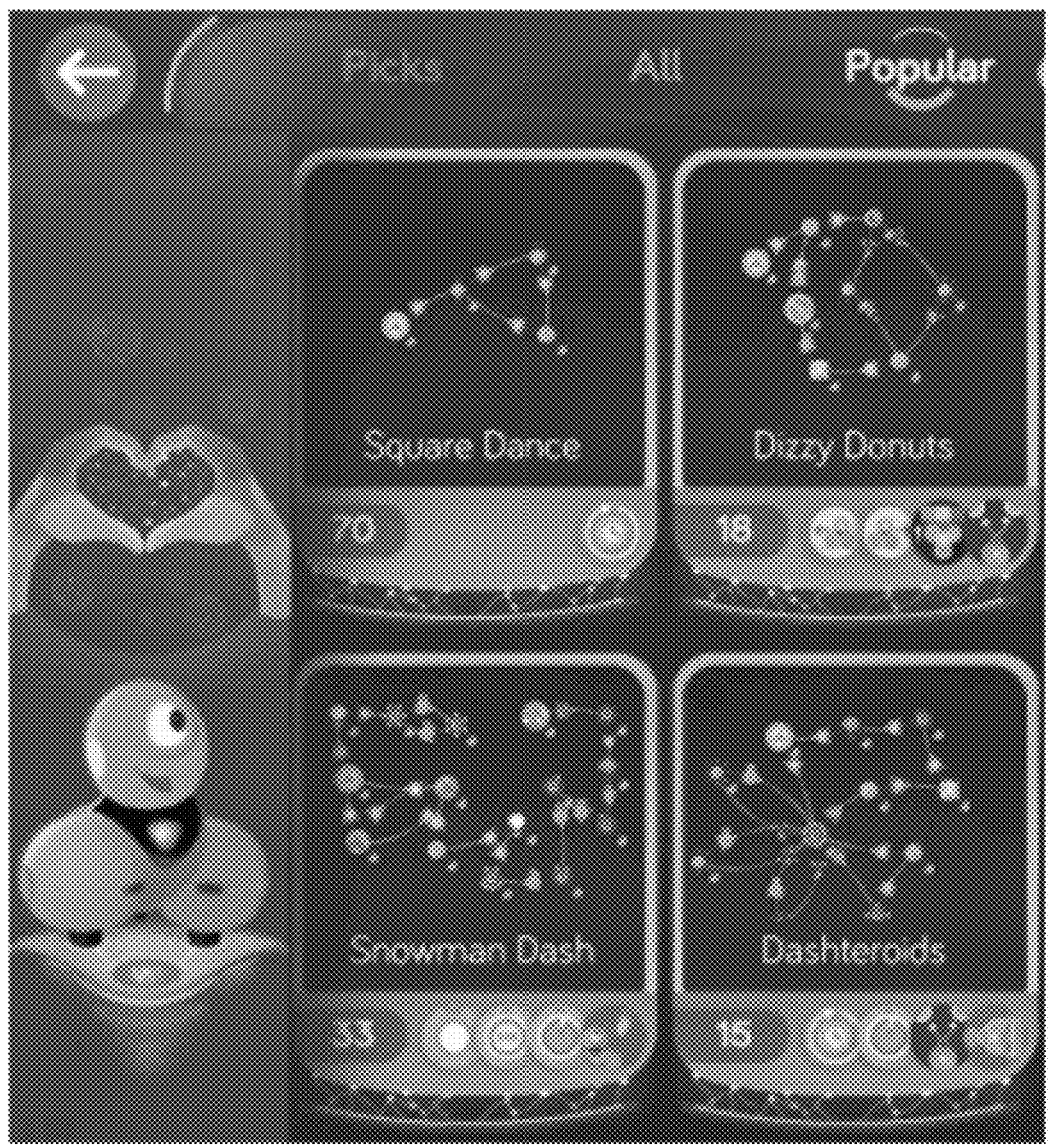
FIG. 26 is a schematic representation of program previews at the community platform in a specific example of a method for sharing robot programs.
Figure 27:
FIG. 27 is a schematic representation of program previews at the community platform in a specific example of a method for sharing robot programs.

As shown in FIGS. 21-22, the method 100 can additionally or alternatively include publishing a robot program S155, which functions to release (e.g., publicly, privately, etc.) a robot program at the community platform for access by one or more users. Publishing a robot program preferably includes generating and/or publishing one or more program previews (e.g., at a robot program browser of the community platform, as shown in FIGS. 26-27), but can additionally or alternatively include publishing any other suitable information. Published information preferably includes robot program data (e.g., title, description, associated image, tags, channel, program preview data, etc.) manually inputted by a user (e.g., at a information form transmitted to the user, as shown in FIG. 15), but can additionally or alternatively include automatically generated robot program data (e.g., based on identification of robot operation states and/or programming inputs encoded by a robot program; timestamp of receipt of the robot program data at the community platform; classification as an original program or a modification of a robot program; etc.). In a variation, publishing a robot program can include publishing a robot program can include generating a robot program channel (e.g., managed by one or more users; by the community platform; etc.); and publishing the robot program to the robot program channel (e.g., to a content feed of the robot program channel, as shown in FIG. 24; to subscribers of the robot program channel; etc.). In another variation, published robot programs and/or associated robot program channels can be recommended and/or filtered based on one or more of: robot program data (e.g., robot operation states, reviews, etc.), user data (e.g., uploaded robot programs; liked robot programs; programming behaviors such as proficiency level; demographics; etc.), robot data (e.g., robot personalities), criteria used in recommending robot programs, and/or any other suitable criteria. Publishing robot programs is preferably performed by the community platform, but can be performed by any suitable component at any suitable time and frequency.

Figure 14:
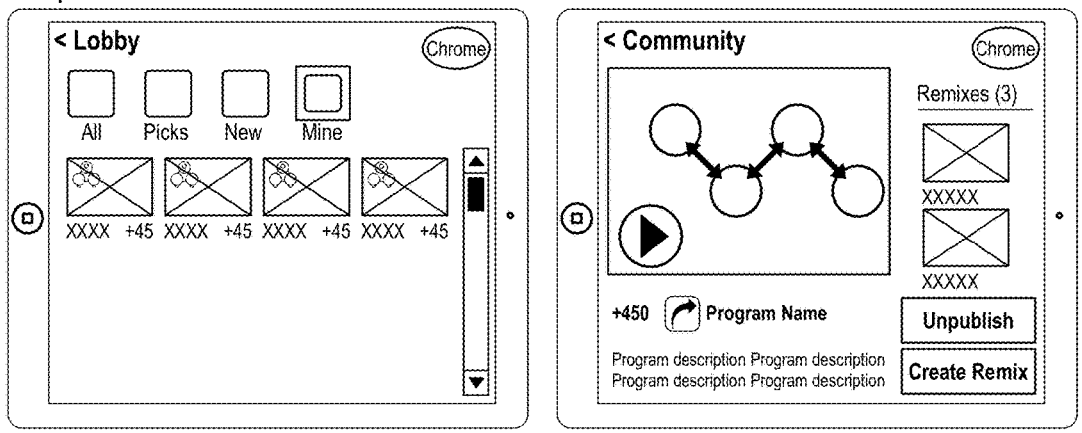
FIG. 14 is a schematic representation of publishing robot programs in a variation of a method for sharing robot programs.
Figure 14:
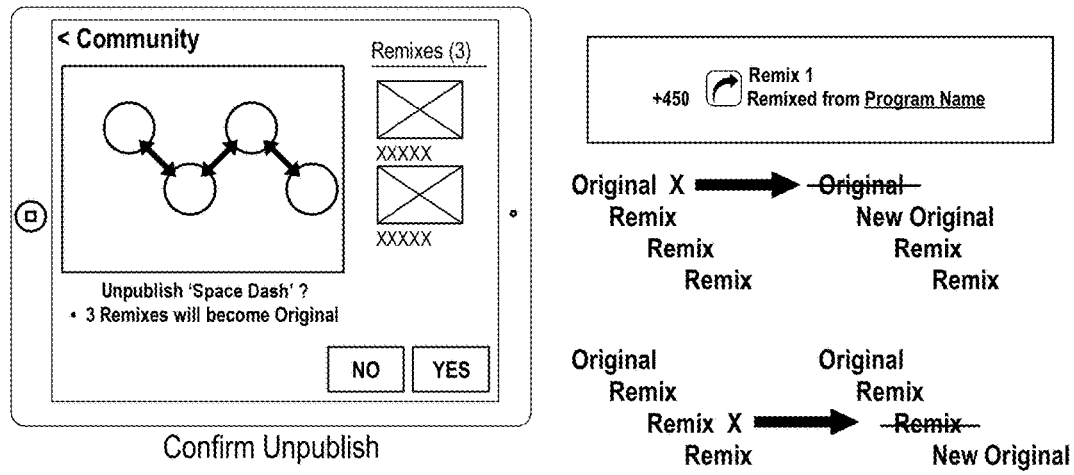
Figure 17:
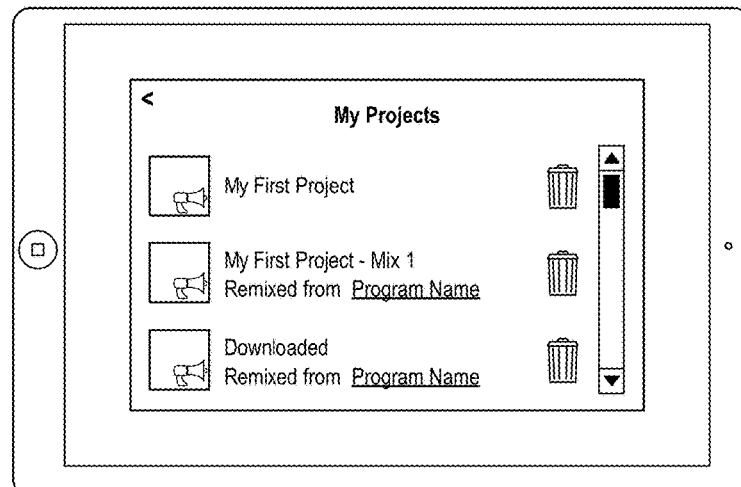
FIG. 17 is a schematic representation of processing modifications in a variation of a method for sharing robot programs.
Figure 17:
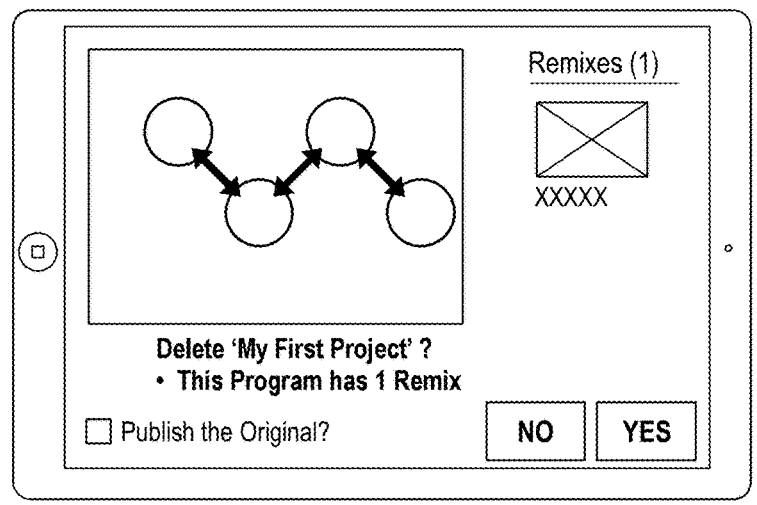

The method 100 can additionally include processing modifications to robot programs, which functions to receive, share, and/or transmit modifications to robot programs to enable collaboration between users. Modifications to robot programs preferably include derivative works of robot programs (e.g., through addition, deletion, and/or modification of programming inputs and/or robot operation states specified by the robot program; translation such as from a first to a second programming interface; reproduction; updating; etc.), but can include any suitable modifications of robot programs. Modifications can be to original programs (e.g., not derived from another robot program), to other modifications of robot programs (e.g., a modification of a modification), and/or to any suitable data associated with robot programs (e.g., program previews, tokens, etc.). As shown in FIGS. 14, 17, and 23, parent programs (e.g., an original program or other robot program for which there is one or more modifications, etc.), can be deleted (e.g., from a user's robot program library; unpublished from the community platform; etc.) along with associated child (e.g., modification) robot programs, or can be deleted independently from associated child robot programs (e.g., where the immediate child in the chain of robot programs becomes an original program).

In a first variation, processing robot program modifications can include generating tokens for the robot program modifications, which can be based on any one or more of: tokens generated for the parent program, user data for users associated with the chain of robot programs (e.g., the original program and any associated modifications), any criteria in relation to generating a token S122, and/or any other suitable criteria. In an example, the method 100 can include: sharing, to a second user, a robot program including a first set of programming inputs from a first user at a first programming interface; receiving a second set of programming inputs from the second user at a second programming interface (e.g., where the robot program is operating at the second programming interface); transforming the first and the second sets of programming inputs into a modified robot program at the second programming interface; and automatically generating and sharing a second token for the modified robot program. In this or other examples, the method 100 can additionally or alternatively include: identifying a modified robot program as a modification of the robot program, and generating the second token for the modification based on the first token (e.g., generated for the robot program), such as in response to identifying the modified robot program. Tokens for modifications can be variants of token content included in the token for the parent program and/or other associated robot programs. In a specific example, generating a token for a modification can include appending the word "Remix" to the token for the parent program. However, generating tokens for modifications can be performed in any suitable manner.

Figure 16:
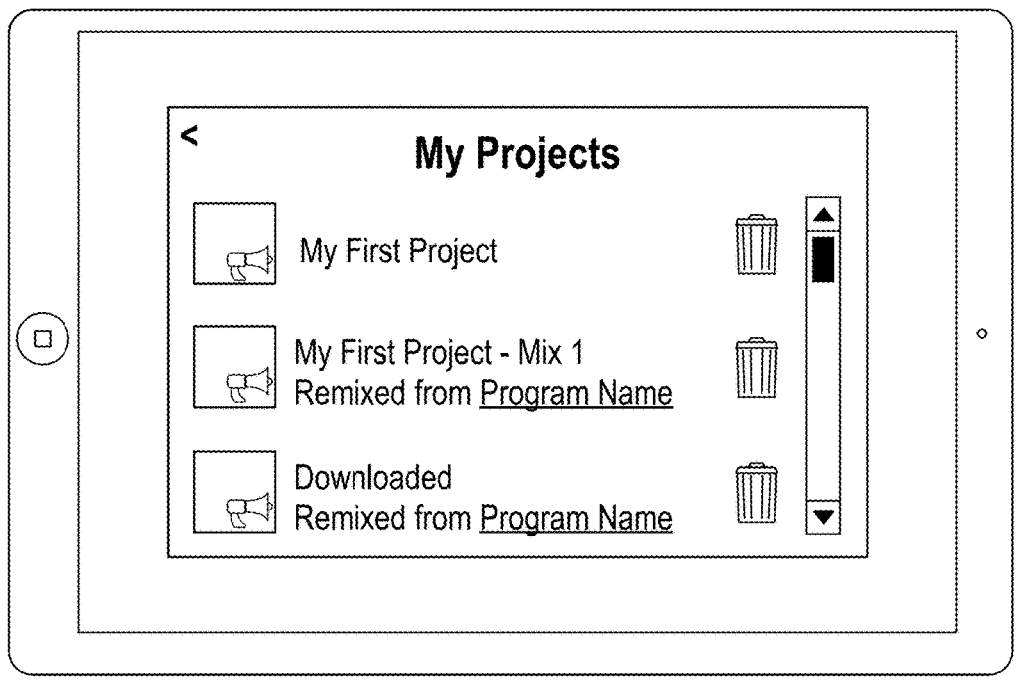
FIG. 16 is a schematic representation of processing modifications in a variation of a method for sharing robot programs.

In a second variation, processing robot program modifications can include publishing modifications. As shown in FIG. 16, modifications are preferably published with a description (e.g., in the program preview) indicating the modification status (e.g., "This program is a modification of the robot program downloadable here"; modification of an original robot program; modification of a modification; etc.), but can be published without any indication of the modification status (e.g., based on user preferences). Modification status is preferably dynamic (e.g., can change based on the publishing status of the original robot program, other modifications of the original robot program, and/or other suitable robot programs, etc.), but can alternatively be static. In an example, the method 100 can include: publishing (e.g., at a community platform) a robot program as a first parent program at a community platform, the robot program associated with a first user; publishing a modified robot program as a child program associated with the first parent program; and in response to receiving an unpublish request associated with the first user, unpublishing the robot program and re-publishing the modified robot program as a second parent program at the community platform. However, publishing modifications can be performed in any suitable manner.

In a third variation, processing modifications can include facilitating real-time collaboration between a plurality of users on one or more robot programs. Facilitating real-time collaboration can include remotely controlling one or more robots based on robot programs stored in the community platform and updated in real-time in response to modifications by one or more users at one or more programming interfaces. Real-time collaboration can facilitate programming education (e.g., for users enrolled in an online robotics course), user engagement, and/or other suitable purposes. In a specific example, users can "chat" with other collaborators by entering and/or selecting vocal content to be transformed into control instructions executed at a receiving robot in operating speakers to emit audio based on the vocal content. Additionally or alternatively, facilitating real-time collaboration can be performed in any suitable manner. However, processing modifications of robot programs can be performed at any suitable time in any suitable manner.

Any portions of the method 100 and/or instances of a portion of the method 100 can be performed in serial (e.g., in response to, etc.), parallel (e.g., concurrently on different threads for parallel computing to improve system processing ability for sharing robot programs, etc.), and/or with any suitable temporal relationship.

4. System.

Figure 7:
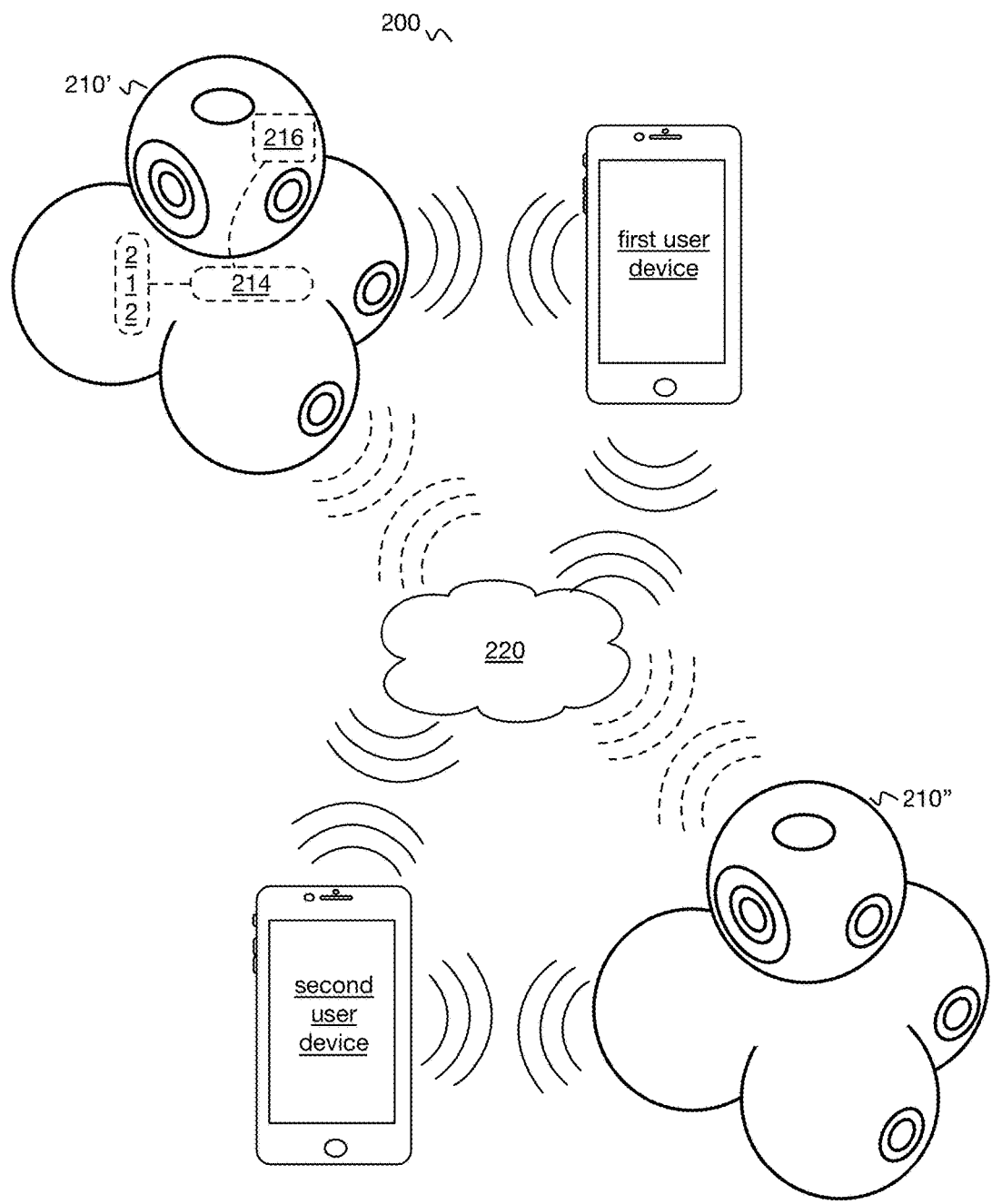
FIG. 7 is a schematic representation of a system for sharing robot programs.

As shown in FIG. 7, an embodiment of a system 200 for circulating robot programs enabling robot interaction with physical surroundings can include: a robot 210 (e.g., toy robot) including a sensor set 212 and/or a processing unit 214; and a community platform 220 configured to perform any suitable portions of the method 100. The system 200 can additionally or alternatively include a programming interface (e.g., executed at the robot 210, at a user device, etc.), and/or any suitable components described in U.S. application Ser. No. 14/737,342 filed 11 Jun. 2015, and U.S. application Ser. No. 15/260,865 filed 9 Sep. 2016, each of which are incorporated in their entirety by this reference. The system 200 and/or portions of the system 200 (e.g., community platform 220) can entirely or partially be executed by, hosted on, communicate with, and/or otherwise include: a remote computing system (e.g., a server, at least one networked computing system, stateless, stateful), a local computing system, robots 210, a user device (e.g., smart phone, laptop, desktop, tablet, smart watch, etc.), databases (e.g., community platform databases, etc.), and/or any suitable component. Communication by and/or between any components of the system 200 can include wireless communication (e.g., WiFi, Bluetooth, radiofrequency, etc.) and/or wired communication. However, the system 200 can include any suitable components for facilitating robot program sharing.

The robot 210 functions as a programmable robotics device configured to execute control instructions for interacting with physical surroundings. The system 200 can include any number of robots 210 (e.g., as shown in FIG. 7, a first robot 210' associated with a first user who generates and uploads a robot program to a community platform 220; a second robot 210" associated with a second user who downloads the robot program and operates the second robot 210" according to the robot program).

The robot 210 preferably includes a sensor set 212, which functions to sample one or more sensor measurements, which can be used in one or more of: generating control instructions, generating a token, mapping a token to a robot program, recommending robot programs, and/or any suitable functionality. The sensor set 212 can include any one or more of: motion sensors, optical sensors, force sensors, touch sensors, system monitoring sensors (e.g., motor monitoring sensors), ambient environment sensors (e.g., audio sensors, light sensors, etc.), and/or any other suitable sensors. However, the sensor set 212 can be configured in any suitable manner.

The robot 210 preferably includes one or more processing units 214, which function to generate and execute control instructions, control robot outputs and communication, and/ or perform other suitable functionality The processing unit 214 can additionally or alternatively function to perform functionality associated with the community platform 220 (e.g., generate, share, and/or resolve tokens for robot programs, etc.). In an example, the processing unit 214 can be configured to execute control instructions derived (e.g., by the processing unit 214; by a programming interface; by the community platform 220; etc.) based on sensor measurements and the robot program (e.g., operating the robot 210 to dance according to the robot program while avoiding physical surroundings identified based on distance sensor measurements and optical sensor measurements). However, processing units 214 can be configured in any suitable manner.

The robot 210 can additionally or alternatively include one or more communication modules 216 (e.g., wireless, wired, etc.), which function to receive and/or transmit robot programs (e.g., and/or control instructions derived from the robot programs), associated robot program data (e.g., tokens identifying the robot programs, robot program previews, robot program requests, etc.), user data (e.g., associated channels, friend lists, etc.), and/or any suitable information between robots 210, a community platform 220, user devices, programming interfaces, and/or any other suitable information. Additionally or alternatively, communication modules 216 of robots 210 can be configured in any suitable manner.

In a variation, the robot 210 can be scheduled to execute control instructions (e.g., execute confirmatory control instructions to inform users of statuses of program sharing processes; emit audio; operate in a robot operation state; perform celebratory actions; a dance; etc.) in response to, substantially concurrently with, and/or with any suitable temporal relationship to one or more program sharing processes (e.g., successful uploading, sharing, downloading, and/or publishing of robot programs; community platform recognition of users based on number of modifications of robot programs associated with users, number of downloads of uploaded robot programs; subscribing to a robot program channel or receiving new subscribers; modifying an original program; receiving a token and/or robot program; etc.). Robot outputs coordinated with program sharing processes can be programmed by a user (e.g., coded and/or selected at a programming interface; etc.), automatically determined (e.g., at the community platform 220; based on robot personalities; etc.), and/or otherwise determined. However, robots 210 can be scheduled to operate in relation to sharing processes in any suitable manner.

Robots 210 and/or any suitable components of robots 210 can be configured in any manner analogous to U.S. application Ser. No. 14/737,342 filed 11 Jun. 2015, and U.S. application Ser. No. 15/260,865 filed 9 Sep. 2016, each of which are incorporated in their entirety by this reference. However, robots and/or associated components can be otherwise configured The community platform 220 functions to receive robot programs (e.g., from user devices, programming interfaces, etc.); generate, distribute, receive, and resolve (e.g., map to a robot program) tokens for robot programs; transmit robot programs (e.g., to a user device requesting the robot program), and/or perform any other suitable functionality and/or portions of the method 100. The community platform 220 preferably stores and/or processes a plurality of robot programs generated by one or more users at one or more types of programming interfaces identified by one or more application identifiers. The community platform 220 preferably includes a remote computing system, but can include any suitable components, and can be configured in any suitable manner.

An alternative embodiment preferably implements the above methods in a computer-readable medium storing computer-readable instructions. The instructions are preferably executed by computer-executable components preferably integrated with a community platform 220. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

Although omitted for conciseness, the preferred embodiments include every combination and permutation of the various system components and the various method processes, where the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. A system for circulating toy robot programs enabling toy robot interaction with physical surroundings, the system comprising:
    a first toy robot associated with a first user device, the first toy robot comprising:
        a first sensor set configured to sample first sensor measurements; and
        a first processing unit configured to execute first control instructions, the first control instructions derived from the first sensor measurements and a program generated at the first user device;
    a remote community platform configured to:
        receive the program from the first user device;
        automatically generate and distribute a program identifier for the program;
        receive the program identifier from a second user device;
        identify the program based on the program identifier; and
        automatically transmit the program to the second user device in response to identifying the program; and
    a second toy robot associated with the second user device, the second toy robot comprising:
        a second sensor set configured to sample second sensor measurements; and
        a second processing unit configured to execute second control instructions, the second control instructions derived from the second sensor measurements and the program.

2. The system of claim 1,
    wherein the first toy robot further comprises a first communications module configured to receive the program identifier from the remote community platform and to transmit the program identifier to the second toy robot,
    wherein the second toy robot further comprises a second communications module configured to receive the program identifier from the first toy robot and to request the program from the remote community platform with the program identifier, and
    wherein the second user device is the second toy robot.

3. The system of claim 1, wherein the remote community platform is further configured to:
    identify a robot operation state encoded in the program; and
    automatically generate the program identifier based on the robot operation state.

4. The system of claim 1, wherein the first sensor measurements are different from the second sensor measurements, and wherein the first control instructions are different from the second control instructions.

5. A method for sharing toy robot programs, the method comprising:
    at a community platform, receiving a first robot program from a first user device;
    at the community platform, in response to receiving the first robot program, automatically selecting a plurality of natural language words from a natural language content library;
    at the community platform, automatically generating a natural language token based on the plurality of natural language words;
    at the community platform, sharing the natural language token;
    at the community platform, receiving the natural language token from a second user device;
    at the community platform, mapping the natural language token to the first robot program; and
    transmitting the first robot program from the community platform to the second user device, wherein second control instructions are generated based on the first robot program, and wherein a toy robot is configured to execute the second control instructions.

6. The method of claim 5, wherein automatically generating the natural language token comprises, at the community platform:
    identifying a robot operation state encoded in the first robot program; and
    automatically generating the natural language token based on the robot operation state.

7. The method of claim 6, wherein the robot operation state is an audio output state, and wherein automatically selecting the plurality of natural language words at the community platform comprises selecting a word associated with the audio output state.

8. The method of claim 5, further comprising:
in response to receiving the first robot program, generating an analysis of the first robot program at the community platform;
selecting a recommended program for the first user at the community platform based on the analysis of the robot program; and
presenting the recommended program to the first user at the first user device.

9. The method of claim 5, further comprising:
receiving a robot profile for the first toy robot at the community platform, the robot profile specifying a toy robot accessory mounted to the first toy robot; and
in response to receiving the first robot program, recommending a recommended program to the first user at the first user device based on the toy robot accessory.

10. The method of claim 5, further comprising:
at the community platform, storing the natural language token in association with a first program identifier identifying the robot program;
wherein mapping the natural language token comprises, at the community platform:
parsing the natural language token into the plurality of natural language words;
retrieving the first program identifier based on a string match between the plurality of natural language words and stored natural language words from the stored natural language token; and
retrieving the robot program based on the first program identifier.

11. The method of claim 10, wherein the natural language token is a non-unique token, and the method further comprises, at the community platform:
storing the non-unique token in association with a second program identifier identifying a second robot program;
receiving user data from the second user device;
mapping the non-unique token to the second robot program and the first robot program; and
selecting the first robot program based on the user data.

12. The method of claim 5, wherein the natural language content library comprises words sorted by parts of speech, and wherein automatically selecting the plurality of natural language words at the community platform comprises selecting the plurality of natural language words based on the parts of speech.

13. A method for sharing toy robot programs, the method comprising:
receiving, at a first programming interface, a first set of programming inputs;
transforming the first set of programming inputs into a robot program at the first programming interface, wherein a first toy robot is configured to execute first control instructions derived from the first robot program;
at a community platform,
automatically generating and sharing a token for the robot program;
receiving the token from a user device;
mapping the token to the robot program;
transmitting the robot program from the community platform to the user device; and
generating second control instructions based on the robot program at a second programming interface associated with the user device, wherein a second toy robot is configured to execute the second control instructions.

14. The method of claim 13, further comprising:
receiving, at the second programming interface, a second set of programming inputs;
transforming the first and the second sets of programming inputs into a modified robot program at the second programming interface; and
at the community platform, automatically generating and sharing a second token for the modified robot program.

15. The method of claim 14, further comprising:
publishing, at a community platform, the robot program as a first parent program at the community platform;
publishing, at the community platform, the modified robot program as a child program associated with the first parent program; and
in response to receiving an unpublish request for the robot program at the community platform, unpublishing the robot program and re-publishing the modified robot program as a second parent program at the community platform.

16. The method of claim 14, further comprising:
identifying, at the community platform, the modified robot program as a modification of the robot program, wherein generating the second token comprises generating the second token based on the first token in response to identifying the modified robot program.

17. The method of claim 13, further comprising:
at the community platform, associating the robot program with a first application identifier identifying the first programming interface; and
at the community platform, receiving a second application identifier with the token from the user device, the second application identifier identifying the second programming interface,
wherein mapping the token to the robot program comprises mapping the token based on a match between the first and the second application identifiers.

18. The method of claim 13, further comprising, at the community platform, determining a privacy level for a user associated with the robot program, wherein automatically generating the token comprises automatically selecting between a unique token generation model and a non-unique token generation model based on the privacy level.

19. The method of claim 18, wherein the token is a locally unique token, and wherein mapping the locally unique token to the program comprises, at the community platform:
receiving location data from the user device substantially concurrently with receiving the token; and
mapping the locally unique token to the program based on the location data.

20. The method of claim 13, wherein the user device is the second toy robot.

* * * * *